United States Patent
Fender et al.

(10) Patent No.: US 11,385,889 B2
(45) Date of Patent: Jul. 12, 2022

(54) INFERRING INTRA PACKAGE AND MODULE DEPENDENCIES

(71) Applicant: Oracle International Corporation, Redwood Shores, CA (US)

(72) Inventors: Pit Fender, Union City, CA (US); Benjamin Schlegel, Merced, CA (US); Matthias Brantner, Sunnyvale, CA (US); Harshad Kasture, Sunnyvale, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/703,499

(22) Filed: Dec. 4, 2019

(65) Prior Publication Data

US 2021/0173621 A1  Jun. 10, 2021

(51) Int. Cl.
*G06F 8/71*  (2018.01)

(52) U.S. Cl.
CPC ...................... *G06F 8/71* (2013.01)

(58) Field of Classification Search
CPC ........ G06F 8/433; G06F 8/60–66; G06F 8/70; G06F 8/71; G06F 8/73–74; G06F 8/75; G06F 8/76; G06F 16/212; G06F 16/2365
See application file for complete search history.

(56) References Cited

U.S. PATENT DOCUMENTS

| 7,895,572 B2* | 2/2011 | Stienhans | G06F 8/70 717/120 |
| 8,627,286 B2* | 1/2014 | Feigen | G06F 8/71 717/123 |

(Continued)

OTHER PUBLICATIONS

Raphaely, D., et al., "Dependencies Among Schema Objects" in: Oracle8 Application Developer's Guide Release 8.0, Oracle Corporation [online], 1997 [retrieved Dec. 2, 2020], Retrieved from Internet: <URL: https://www.bnl.gov/phobos/Detectors/Computing/Orant/doc/appdev.804/a58241/ch11.htm>, whole document.*

(Continued)

*Primary Examiner* — Todd Aguilera
(74) *Attorney, Agent, or Firm* — Hickman Becker Bingham Ledesma LLP; Brian N. Miller

(57) ABSTRACT

Herein are machine learning (ML) feature processing and analytic techniques to detect anomalies in parse trees of logic statements, database queries, logic scripts, compilation units of general-purpose programing language, extensible markup language (XML), JAVASCRIPT object notation (JSON), and document object models (DOM). In an embodiment, a computer identifies an operational trace that contains multiple parse trees. Values of explicit features are generated from a single respective parse tree of the multiple parse trees of the operational trace. Values of implicit features are generated from more than one respective parse tree of the multiple parse trees of the operational trace. The explicit and implicit features are stored into a same feature vector. With the feature vector as input, an ML model detects whether or not the operational trace is anomalous, based on the explicit features of each parse tree of the operational trace and the implicit features of multiple parse trees of the operational trace.

15 Claims, 10 Drawing Sheets

(56) References Cited

U.S. PATENT DOCUMENTS

| | | | | |
|---|---|---|---|---|
| 8,707,260 | B2* | 4/2014 | Hawkins | G06F 8/75 717/121 |
| 9,135,293 | B1 | 9/2015 | Kienzle et al. | |
| 9,424,323 | B2* | 8/2016 | Mishra | G06F 16/258 |
| 9,542,416 | B2* | 1/2017 | Watson | G06F 16/16 |
| 10,114,849 | B2* | 10/2018 | Paraschivescu | G06F 16/2477 |
| 11,294,894 | B2* | 4/2022 | Fender | G06F 16/2438 |
| 2002/0087412 | A1* | 7/2002 | Wood | G06Q 50/12 705/15 |
| 2007/0038662 | A1 | 2/2007 | Bendel et al. | |
| 2007/0038983 | A1* | 2/2007 | Stienhans | G06F 8/70 717/127 |
| 2007/0220020 | A1 | 9/2007 | Goto | |
| 2008/0295065 | A1* | 11/2008 | Hawkins | G06F 8/70 717/103 |
| 2009/0198709 | A1* | 8/2009 | Mishra | G06F 16/258 |
| 2011/0239192 | A1* | 9/2011 | Feigen | G06F 8/71 717/123 |
| 2011/0252395 | A1 | 10/2011 | Charisius et al. | |
| 2013/0263116 | A1 | 10/2013 | Haupt et al. | |
| 2015/0379061 | A1* | 12/2015 | Paraschivescu | G06F 16/2329 707/695 |
| 2016/0124993 | A1* | 5/2016 | Watson | G06F 16/29 707/690 |
| 2018/0336020 | A1 | 11/2018 | Berg et al. | |
| 2019/0065552 | A1 | 2/2019 | Brantner et al. | |
| 2020/0110601 | A1 | 4/2020 | Shah | |
| 2020/0225923 | A1* | 7/2020 | Chakravarthy | G06F 8/65 |
| 2021/0064613 | A1 | 3/2021 | Fender | |
| 2021/0064614 | A1* | 3/2021 | Fender | G06F 16/252 |
| 2021/0117548 | A1* | 4/2021 | Gokhman | G06F 8/433 |

OTHER PUBLICATIONS

Lorentz, D., et al., "Create Function" in: Oracle Database SQL Reference 10g Reference 2, Oracle Corporation [online], 2005 [retrieved Dec. 4, 2020], Retrieved from Internet: <URL: https://web.stanford.edu/dept/itss/docs/oracle/10gR2/server.102/b14200/statements_5009.htm>, whole document.*

Anonymous, "Interface Dependable", Oracle Fusion Middleware Java API Reference for Oracle Extension SDJ 12c (12.1.3) [online], 2014 [retrieved Aug. 17, 2021], Retrieved from Internet: <URL: https://docs.oracle.com/middleware/1213/jdev/api-reference-esdk/oracle/ide/model/Dependable.html>, pp. 1-2.*

Anonymous, "Module List View", DependencyWalker.com [online], 2018 [retrieved Aug. 18, 2021], Retrieved from Internet: <URL: https://web.archive.org/web/20180221142324/https://www.dependencywalker.com/help/html/hidr_module_list_view.htm>, pp. 1-2.*

Mindrones, "timely-dependency-graph" GitHub [online], 2016 [retrieved Oct. 18, 2021], Retrieved from Internet: <URL: https://github.com/mindrones/timely-dependency-graph/blob/6d9d6f4dd35a01d344269864a60a7706e4b8ec57/README.md>, pp. 1-3.*

Wimmer, Christian, Oracle, "One VM to Rule Them Ah", VM Research Group, Oracle Labs, dated 2016, 130 pages.

Oracle Document, "9 Using PL/SQL Packages", https://docs.oracle.com/cd/B13789_01/appdev.101/b10807/09_packs.htm, dated 2003, 14 pages.

Github, "Writing a Language in Truffle. Part 1: A Simple, Slow Interpreter", dated Oct. 13, 2014, 17 pages.

Franklin, Christopher, "A Guide to Java 9 Modularity", https://www.baeldung.com/java-9-modularity, dated May 12, 2019, 14 pages.

Fehrenbach, Stefan, "Just-in-time Compilation for Generalized Parsing", dated Sep. 1, 2014, 41 pages.

C. M. Saracco, "Leveraging DBMS Stored Procedures Through Enterprise JavaBeans", IBM Corporation, TR 03.723 dated Aug. 2000, 49 pages.

Sipek et al., "Exploring Aspects of Polyglot High-Performance Virtual Machine GraalVM," MIPRO 2019, May 20, 2019, pp. 1671-1676.

Grimmer et al., "Cross-Language Interoperability in a Multi-Language Runtime," ACM Transactions on Programming Language and Systems, vol. 40, No. 2, May 28, 2018, pp. 1-44.

* cited by examiner

FIG. 7

| OWNER | MLE MODULE | DEPENDENCY ID | DEPENDENCY NAME | VERSION | RESOLVED | INTEGRITY | DEPENDENCIES |
|---|---|---|---|---|---|---|---|
| 1 SCOTT | MODULE_B | 1 | mustache | 3.0.1 | https://registry.s... | sha512-3Y/... | 0 |
| 2 SCOTT | MODULE_B | 2 | chai | 4.3.0 | https://registry.s... | sha512-RQD... | 1 |
| 3 SCOTT | MODULE_B | 3 | validator | 13.1.0 | https://registry.s... | sha512-qAQ... | 0 |
| 4 SCOTT | MODULE_B | 4 | moment | 6.1.4 | https://registry.s... | sha512-RMC... | 1 |
| 5 SCOTT | MODULE_B | 5 | npc | 14.1.1 | https://registry.s... | sha512-C2D... | 1 |
| 6 SCOTT | MODULE_A | 1 | babel-core | 6.26.3 | https://registry.s... | sha512-6yF... | 0 |
| 7 SCOTT | MODULE_A | 2 | babel-code-frame | 6.26.0 | https://registry.s... | sha512-q/K... | 1 |
| 8 SCOTT | MODULE_A | 3 | babylon | 6.18.0 | https://registry.s... | sha1-Y/1Db... | 1 |
| 9 SCOTT | MODULE_A | 4 | async | 3.1.0 | https://registry.s... | sha512-4rwz... | 0 |
| 10 SCOTT | MODULE_A | 5 | babelify | 10.0.0 | https://registry.s... | sha512-X4dF... | 1 |
| 11 SCOTT | MODULE_A | 6 | lodash | 4.17.14 | https://registry.s... | sha512-mmK... | 0 |

FIG. 8

| OWNER | MLE MODULE | DEP ID | DEPENDENCY NAME | VERSION | SUB ID | SUB DEPENDENCY |
|---|---|---|---|---|---|---|
| 1 SCOTT | MODULE_B | module_b | 1 mustache | 3.0.1 | | 1 chai |
| 2 SCOTT | MODULE_B | module_b | 2 chai | 4.3.0 | (null) | (null) |
| 3 SCOTT | MODULE_B | module_b | 3 validator | 11.1.0 | | 1 mocha |
| 4 SCOTT | MODULE_B | module_b | 3 validator | 11.1.0 | | |
| 5 SCOTT | MODULE_B | module_b | 4 mocha | 6.1.4 | | 2 nyc |
| 6 SCOTT | MODULE_B | module_b | 5 nyc | 14.1.1 | (null) | (null) |
| 7 SCOTT | MODULE_A | module_a | 1 babel-core | 6.26.3 | | 1 babel-code-frame |
| 8 SCOTT | MODULE_A | module_a | 1 babel-core | 6.26.3 | | 2 babylon |
| 9 SCOTT | MODULE_A | module_a | 2 babel-code-frame | 6.26.0 | (null) | (null) |
| 10 SCOTT | MODULE_A | module_a | 3 babylon | 6.18.0 | (null) | (null) |
| 11 SCOTT | MODULE_A | module_a | 4 async | 3.1.0 | | 1 babel-core |
| 12 SCOTT | MODULE_A | module_a | 4 async | 3.1.0 | | 2 babylon |
| 13 SCOTT | MODULE_A | module_a | 5 lodash | 10.0.0 | (null) | (null) |
| 14 SCOTT | MODULE_A | module_a | 6 lodash | 4.17.14 | (null) | (null) |

PRIOR ART

PRIOR ART

INFERRING INTRA PACKAGE AND MODULE DEPENDENCIES

RELATED CASE

Herein incorporated by reference in its entirety is related U.S. patent application Ser. No. 16/556,760 filed on Aug. 30, 2019 by Pit Fender et al. titled "DYNAMIC RESOLUTION OF DEPENDENCIES FOR DATABASE GUEST LANGUAGES".

FIELD OF THE INVENTION

The present invention relates to polyglot programing of a database. Herein are techniques that extend a database management system (DBMS) to automatically discover and report a hierarchy of dependencies used by guest modules for guest programing languages that are implemented in the DBMS.

BACKGROUND

Data persistence may take various logical forms. Transactional workloads (OLTP) are supported by data models that somewhat differ from those used in analytic workloads (OLAP). Document and multimedia data rely on formats like JAVASCRIPT object notation (JSON) and extensible markup language (XML). The concept that different database models are better suited to address the needs of different applications is referred to as Polyglot Persistence.

One way to address these polyglot requirements is to have separate products that implement a specific database model to address specific applications. Examples of this include ORACLE offerings such as Berkeley DB as a KeyValue store, ORACLE NoSQL Database as a Key-Value and sharded database, ORACLE TimesTen as an In-Memory Database, and ESSBASE for analytic processing.

Various open source and proprietary products are available to support a single model Polyglot Persistence approach. As commercial enterprise relational databases have developed over time, they have encompassed multiple data models and access methods within a single database management system. This concept is called Multimodel Polyglot Persistence and it allows many applications to use the same database management system while continuing to benefit from the unique data model necessary for a specific application.

Modern programming languages like JAVASCRIPT and PYTHON benefit from a rich and vast ecosystem of publicly available libraries and add-on components. However, even polyglot database systems lack generalized support for a software development lifecycle (SDLC) with multiple programing languages. For example with JAVASCRIPT and PYTHON, package management and package imports have discrepant approaches that may be difficult or impossible to reconcile. There exists no clear and consistent way of discovering, within a database management system (DBMS), which guest language software components depend on which other guest language software components.

BRIEF DESCRIPTION OF THE DRAWINGS

In the drawings:

FIG. 7 depicts a tabular result of a select query of example MLE_MODULE_INTROSPECTION_VIEW for example deployments of Module A and Module B;

FIG. 8 depicts a tabular result of a select query of example MLE_MODULE_CONTENT_HIERARCHY_VIEW for example deployments of Module A and Module B;

DETAILED DESCRIPTION

Figure 1:
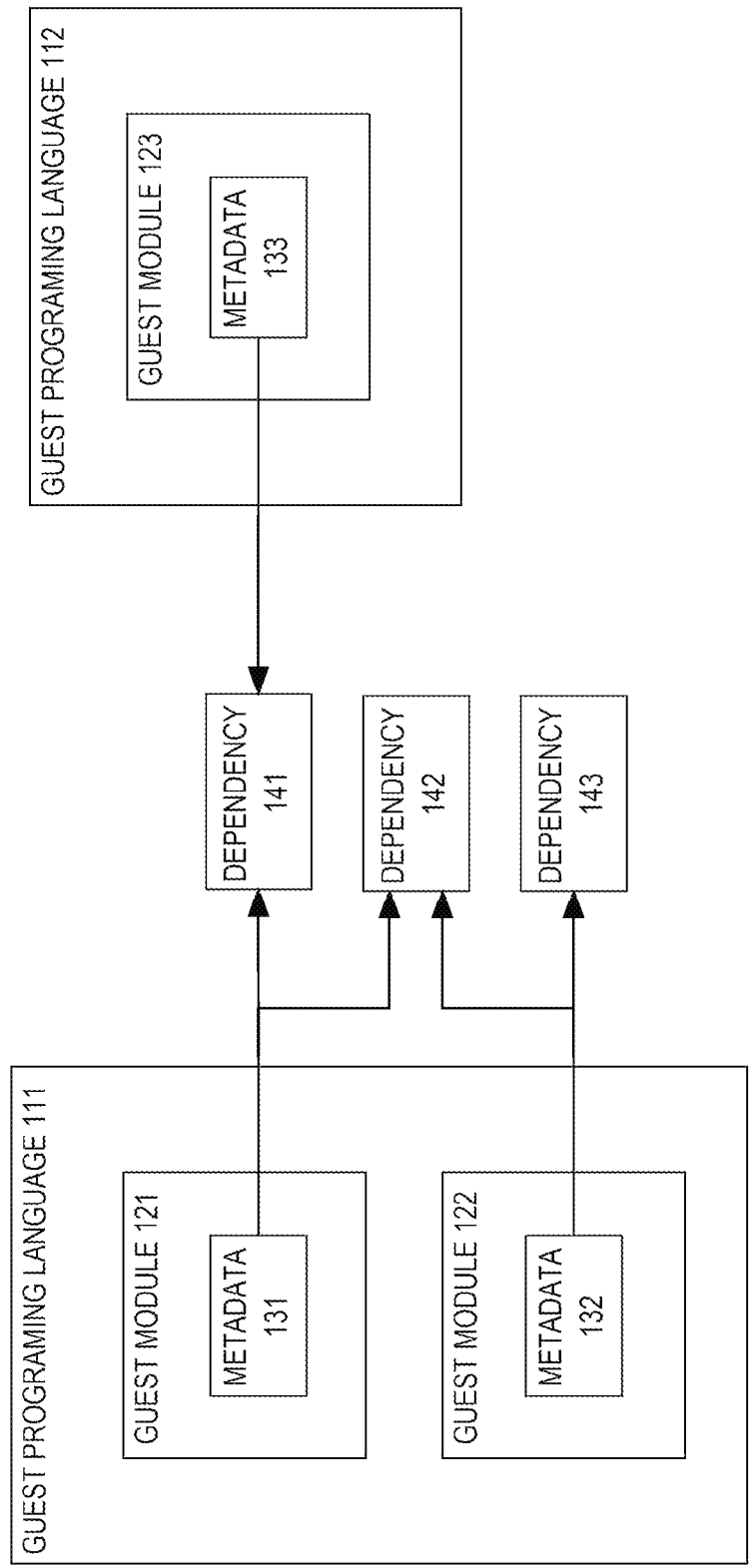
FIG. 1 is a block diagram that depicts an example database management system (DBMS) that, for identifying dependencies of a particular guest module of many guest modules, generates a report of dependencies that is based on metadata extracted from the guest modules.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are techniques that extend a polyglot database management system (DBMS) to automatically discover and report a hierarchy of dependencies used by guest modules for guest programing languages that are implemented in the DBMS. Introspection instrumentation, including dependency hierarchy metadata, is generated and operated to reveal interdependent dependencies of guest modules. Without the package introspection techniques herein, there exists no clear and uniform way of discovering which software components a guest module consists of. For example, the DBMS may have a privilege model that allows users to deploy guest language code without needing administrator privileges, which may intensify a need for guest module introspection. For example, there may be a requirement for a database administrator (DBA) that is not a guest module developer to be able to detect which versions of which open source software components such as libraries does a guest module consists of.

In an embodiment, introspection information is inserted into a guest module as a nested data type such as JAVASCRIPT object notation (JSON) or extensible markup language (XML). The introspection information is exported via language specific exporting mechanisms, which for JAVASCRIPT or PYTHON may be a function returning the nested data type.

Techniques herein expose the module introspection information as a database view. By querying this view the user is provided with detailed module packaging information in a normalized form. A document query language such as JSON query, as discussed later herein, may be used to unnest any nested data types and extract the contained data in a normalized form. Such query language constructs may facilitate database view(s) that extract and organize dependency metadata into a hierarchical and/or tabular form. For example, the DBMS may gather the list of deployed guest modules from the database view(s).

Respective auxiliary helper tools presented herein are responsible for guest module bundling and deployment for each guest language. The helper tools gather bundling information and add that information to guest module source code, such as dependency metadata and introspection functions. A database call specification is generated, such as with a reserved name, for each guest module, such as when the guest module is deployed. This task is carried out by the auxiliary helper tool of the guest language. By integrating dependency introspection instrumenting into auxiliary helper deployment tools, approaches herein provide an automated way of gathering and including the dependency metadata directly within each deployed guest module.

In an embodiment, a client bundling program extracts, from source file(s) that are part of a guest module, metadata that specifies dependencies of the guest module. An introspection function is generated that returns the metadata that specifies the dependencies. A database call specification is generated for the introspection function. A same or different client program sends to a DBMS: the source file(s) that are part of the guest module, the metadata that specifies the dependencies, the introspection function, and the database call specification for the introspection function.

In an embodiment, a DBMS extracts, from guest module(s) that are defined in guest programming language(s) that are implemented in the DBMS, metadata that describes dependencies of the guest module(s). A report of dependencies that is based on the metadata that describes the dependencies is generated. The DBMS may identify, based on the report of dependencies, a subset of the dependencies that particular guest module(s) depend on.

1.0 Example Computer System

FIG. 1 is a block diagram that depicts an example database management system (DBMS) 100, in an embodiment. For identifying dependencies of a particular guest module of many guest modules, DBMS 100 generates a report of dependencies that is based on metadata extracted from the guest modules. DBMS 100 contains and is hosted by one or more computers, not shown, each of which may be a rack server such as a blade, a personal computer, a mainframe, a virtual computer, or other computing device. When DBMS 100 contains multiple computers, the computers are interconnected by a communication network.

According to techniques presented in related U.S. patent application Ser. No. 16/556,760, DBMS 100 supports polyglot (i.e. multilingual) programable databases, such as with a multilingual engine (MLE) software layer that can embed, for multiple guest programing languages, respective interpreters and/or virtual machines, such as a JAVA virtual machine (JVM), a JAVASCRIPT interpreter, individually, or as a combination such as in ORACLE's Graal MLE. For example, a MLE may interpret text scripts, generate bytecode, interpret bytecode, and/or compile bytecode into native machine instructions such as by just in time (JIT) compilation. A MLE may contain a JVM that executes bytecode generated from source logic of multiple guest programing languages 111-112.

According to techniques presented in related U.S. patent application Ser. No. 16/556,760, a new guest programing language may be added to DBMS 100 more or less as a plugin that extends the DBMS 100 with new capabilities such as interpreting or otherwise executing logic written in the new guest programing language. For example, DBMS 100 may be originally provided as middleware from an original equipment manufacturer (OEM) or independent software vendor (ISV) without support for any particular guest programing languages. After deployment of DBMS 100, support for particular new guest programing language(s) may be added to DBMS 100 as after market extensions. For example, DBMS 100 is future proof because DBMS 100 is ready to incorporate an implementation of a new guest programing language that did not exist when DBMS 100 was originally deployed.

Each of guest modules such as 121-123 is an administrative and/or lexical (i.e. scope/visibility) unit that defines guest object(s) (not shown) such as subroutines that are native to a guest programming language such as 111-112 and are available for access, such as public access, from outside of the guest module. Guest module 121 may contain other objects that are: a) also publicly accessible but are not subroutines, such as global variables, such as data structures, b) only accessible from within guest module 121, or c) only accessible within guest programing language 111, depending on the embodiment.

In an embodiment, guest module 121 may be created for guest programing language 111 by executing a data definition language (DDL) statement in DBMS 100, such as presented later herein and in related application Ser. No. 16/556,760. When created, guest module 121 may be registered within a database schema (not shown), such as a schema that is expressly named in the DDL statement or within a default schema, such as a current, global, and/or system schema. Because a schema acts as a namespace, modules in different schemas may have a same unqualified name but different respective name qualifiers.

In one example, the DDL statement that creates guest module 121 contains source logic of guest programing language 111 that DBMS 100 executes to creates guest module 121. In another example, the DDL statement references a script file of guest programing language 111 that DBMS 100 executes to creates guest module 121. In another example, the DDL statement references a large object (LOB), such as a character LOB (CLOB) or binary LOB (BLOB), that is stored as a field value in a row of a database table in DBMS 100.

As explained above, guest module 121 may define guest object(s) such as a guest subroutine that is publicized and available for use by: other guest modules such as 122 of same guest programing language 111, guest modules such as 123 in other guest programing languages such as 112, and a data manipulation language (DML) that is native to DBMS 100, such as structured query language (SQL).

A DML is a domain specific language (DSL) whose domain is database content. A DML is designed to access content structures within a database, such as tables, records, and fields, including relational keys. A DML is native to DBMS 100 because the DBMS 100 is originally designed to interpret or otherwise execute the DML. For example, DBMS 100 may have a query planner that is heavily dependent on aspects of the DML. Whereas, the query planner is unaware of distinguishing aspects of guest programing languages, such as grammar, semantics, and data types of guest programing languages.

DBMS 100 may execute a DML statement (not shown), such as a database query, that invokes guest programing language 111 and/or 112 in DBMS 110. For example as presented later herein, a database administrator (DBA) may export a subroutine of guest programing language 140 as a user defined function (UDF) or stored procedure that the DML statement can invoke.

For example, the DML statement may be a query. Thus, guest programming language 111 is indirectly available to DML queries without exposing clients to guest programming language 111. For example, a legacy query may invoke a complicated UDF that was originally implemented as suboptimal DML and eventually transparently retrofitted, such as reimplemented and accelerated, by guest programing language 111.

Each of guest modules 121-123 may export (i.e. publicize) and import (i.e. use) guest objects. A guest module such as 121 may depend on multiple dependencies such as 141-142 that are not exported by guest modules, but instead are implemented as software libraries, such as a third party library and/or an archive file, that can be linked into guest module 121.

Likewise, a dependency such as 142 may be needed by multiple guest modules such as 121-122. A dependency such as 141 may be needed by guest modules 121 and 123 that are defined in respective different guest programming languages 111-112.

In any case, each guest module 121-123 provides, in a way that may be based on which guest programming language implements the guest module, respective metadata 131-133 that identifies needed dependency(s) 141-143. In an embodiment, each of guest modules 121-123 provides a respective guest function in a respective guest programming language that DBMS 100 may invoke to extract respective metadata, such as 131-133, that catalogs needed dependency(s). Dependencies and dependency metadata extraction are discussed later herein.

Thus by introspection of metadata 131, DBMS 100 may discover that guest module 121 depends on dependencies 141-142. After extracting metadata 131-133, DBMS 100 may generate a report (not shown), such as for immediate use or storing for later use, or other aggregation that summarizes metadata 131-133 in a way that reveals which of guest modules 121-123 depends on which dependencies 141-143. Example dependency reports are presented later herein.

Various embodiments may provide various combinations of the following example contents that a dependency report may contain for each dependency of one, some, or all guest modules:
  a name of the dependency,
  a version number or release date of the dependency,
  a name of at least one guest module that depends on the dependency,
  a name of at least one other dependency that depends on the dependency,
  a name of at least one other dependency that the dependency depends on,
  a name of at least one database schema in which the dependency is defined,
  an integrity value,
  a universal resource identifier (URI) that identifies an implementation of the dependency,
  a timestamp of when the implementation of the dependency was incorporated into the DBMS,
  an identifier of a database user or database role that incorporated the dependency into the DBMS, and/or
  a flag that indicates whether or not the dependency is only for development.

An integrity value may be a checksum such as a cyclic redundancy check (CRC) code or other hash code that can be calculated from a codebase of a guest module to detect whether or not the codebase of the guest module has been tampered. For example, a guest module may be implemented as a library in an archive file that is distributed with an original integrity value that was calculated, based on the archive file, by an independent software vendor (ISV) or other author. For example, a URI such as a universal resource locator (URL) may be used to retrieve the original archive file and/or the original integrity value. A dependency report may indicate whether or not the original integrity value matches: a) an integrity value for the archive file when the archive file was deployed into DBMS 100, such as during deployment of the guest module, and/or b) an integrity value for the archive file as currently stored for DBMS 100.

In some cases, a guest module needs a particular dependency only for development purposes and not for production use. For example, dependency 143 may contain a tooling extension, such as a plugin for an integrated development environment (IDE) or a test suite of test cases for unit testing. Metadata 132 may contain a flag that indicates that guest module 122 needs dependency 143 only for development.

2.0 Example Dependency Discovery and Reporting Process

Figure 2:
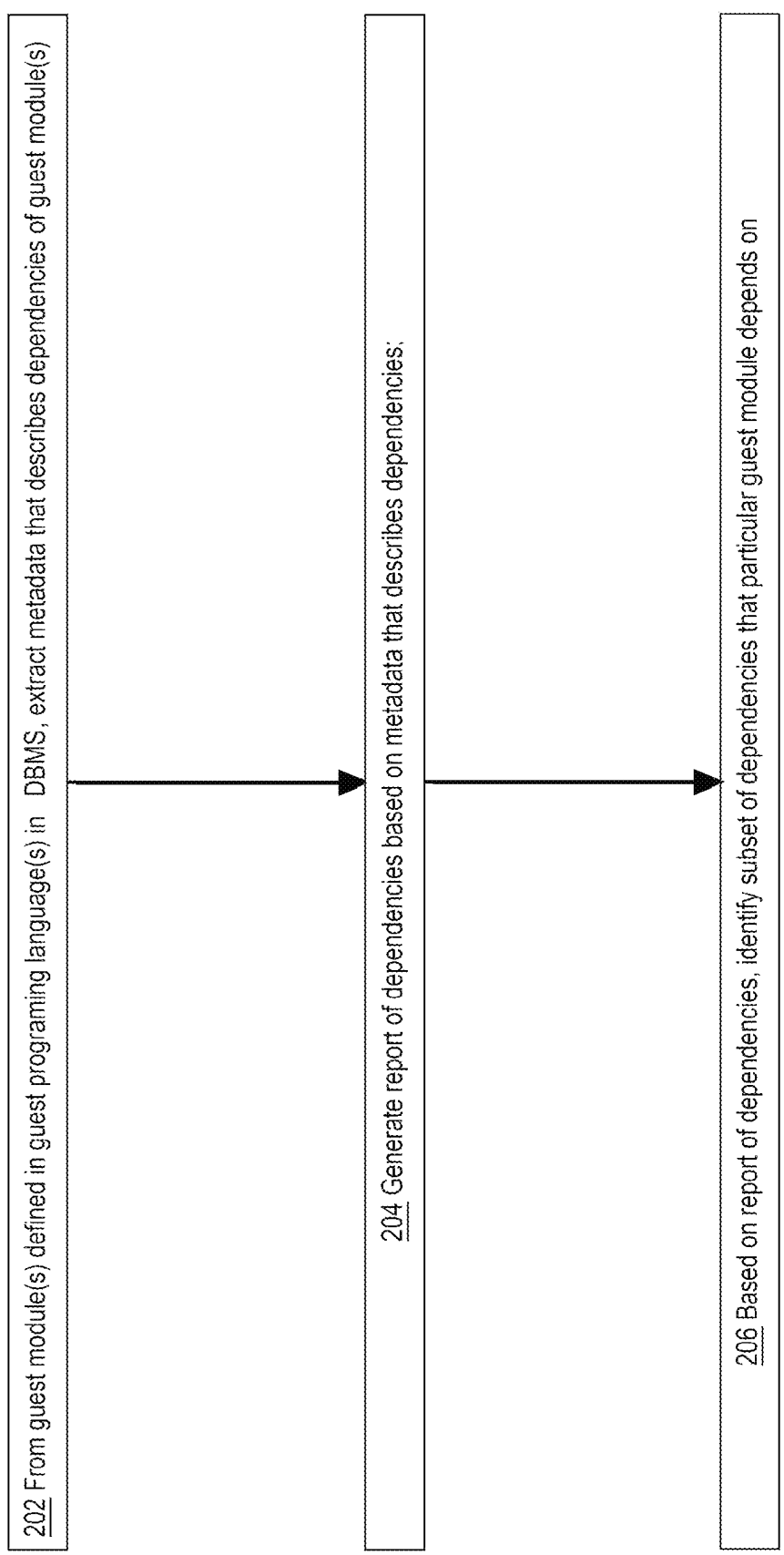
FIG. 2 is a flow diagram that depicts an example computer process for generating a report of dependencies that is based on metadata extracted from guest modules in a DBMS, such as for identifying dependencies of a particular guest module.

FIG. 2 is a flow diagram that depicts an example process for generating a report of dependencies that is based on metadata extracted from guest modules in a DBMS, such as for identifying dependencies of a particular guest module. FIG. 2 is discussed with reference to FIG. 1.

Figure 3:
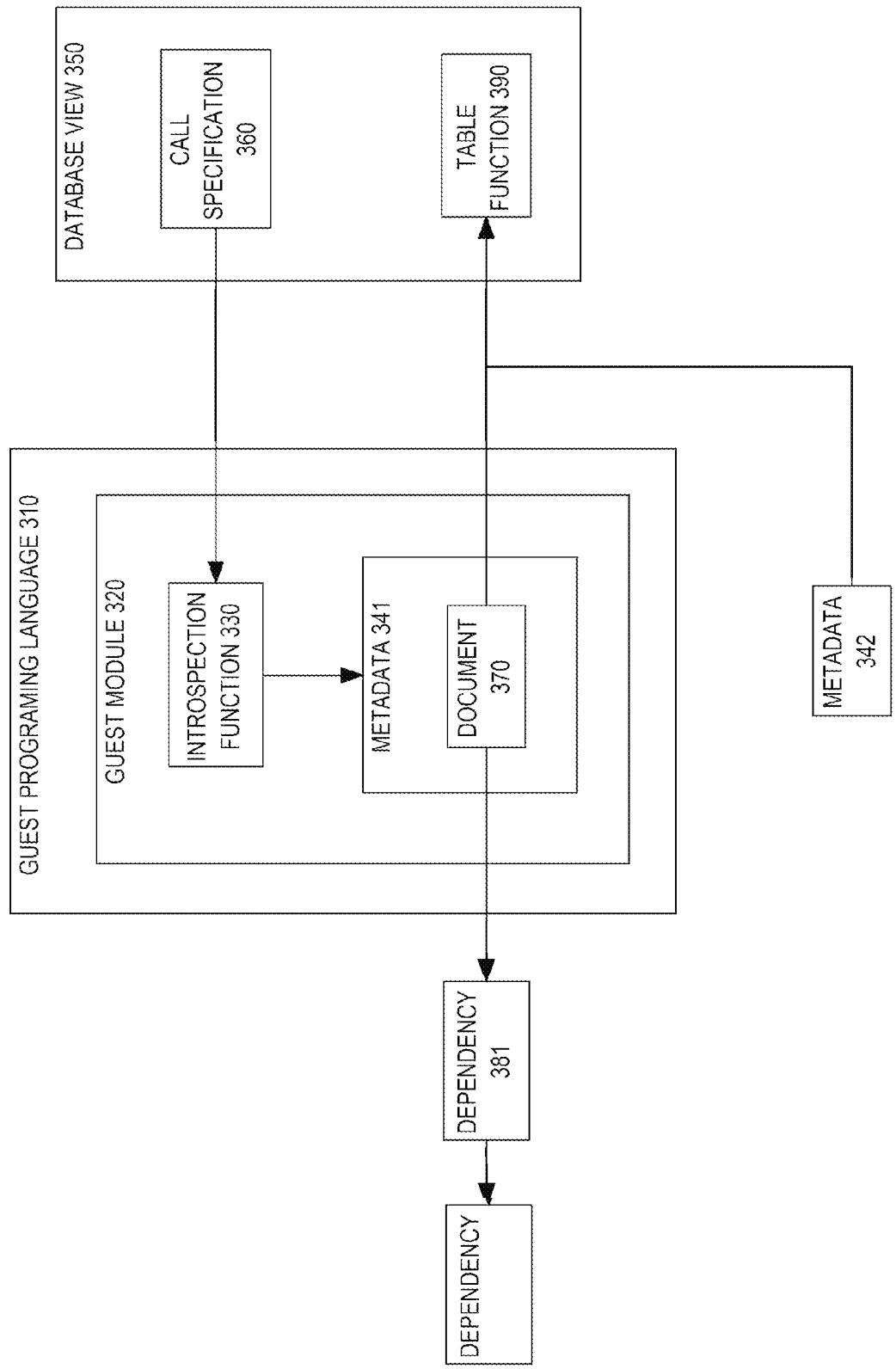
FIG. 3 is a block diagram that depicts an example DBMS that extracts, in a language-neutral format from guest modules, dependency metadata that is aggregated by a database table function that backs a database view that may be interrogated to discover module dependencies.

The timing of steps 202, 204, and 206 depends on the scenario. In one scenario, those steps may immediately occur when guest module 121 is deployed into DBMS 100. In another scenario, those steps occur later and on demand, such as for dependency auditing of particular guest module(s) or all guest modules in DBMS 100. Example database commands to initiate the process of FIG. 3 are presented later herein.

From one or all guest module(s) 121-123 defined in guest programming language(s) 111-112 in DBMS 100, step 202 extracts metadata, such as 131-133, that describes dependencies, such as 141-143, of guest module(s). For example if the scenario entails deployment of particular guest module 121, then an embodiment may limit metadata extraction to metadata 131 that describes some dependencies 141-142. If the scenario instead entails a full audit of all guest modules 121-123, then extraction includes all metadata 131-133 that describes all dependencies 141-143.

Step 204 generates a report of dependencies based on metadata that describes the dependencies. For example, metadata extracted during step 202 may be used to generate a dependency report that is tabular. Normalization of the tabular data may depend on the embodiment and/or the scenario.

For example, each row of the report may have a semantic scope that contains one dependency of one guest module, all dependencies of one guest module, or all guest modules that include a same one dependency. Each row the report may be stored in a row of a database table and/or printed as a line item in a textual report, such as a spreadsheet. Mechanisms for metadata extraction, parsing, and normalization are presented later herein.

Performance or omission of step 206 depends on the scenario. In a full audit of all guest modules or a deployment of one guest module, the dependency report generated by step 204 may be sufficient. However as explained later herein, the dependency report may be generated by a DML statement, such as with a table function, and/or the dependency report may be recorded as rows in a database table.

Thus, step 206 may apply projection, sorting, grouping, and/or filtration, such as with a DML statement, to identify or otherwise organize a listing of dependencies and guest modules in a particular way. For example, step 206 may identify: a) which guest modules are impacted by a same stale (i.e. obsolete) or buggy (i.e. defective) version of a particular dependency, b) which guest modules depend on any version, such as in a particular range of versions, of a particular third party library, such as when migrating those guest modules to a same latest version, c) which guest modules depend on incompatible versions of two dependencies, and/or d) which dependencies have tampered implementations.

Thus, a developer or DBA may have more or less custom and consolidated visibility into relevant portions of the combined codebase of all guest modules, even though an embodiment may not entail actual sharing of codebase files between guest modules, such as when each guest module should have its own copy of a same version of a dependency. For example, in a multi-tenant DBMS such as in a private cloud of an enterprise, diversity of dependencies and versions, and duplicates thereof, may be more or less difficult to review without performing step 206.

3.0 Introspection Instrumentation

FIG. 3 is a block diagram that depicts an example DBMS 300, in an embodiment. DBMS 300 extracts, in a language-neutral format from guest modules, dependency metadata that is aggregated by a database table function that backs a database view that may be interrogated to discover module dependencies. DBMS 300 may be an implementation of DBMS 100.

Within DBMS 300, guest module 320 is implemented in guest programing language 310. Guest module 320 has metadata 341 that indicates that guest module 320 needs dependency 381. Guest module 320 and other guest modules (not shown) may depend on other dependencies (not shown) as indicated by respective metadata such as 342.

Database view 350 is defined in DBMS 300 to provide access to dependency information that is stored in metadata such as 341-342. Unlike a usual database view that is backed by ordinary database table(s), database view 350 instead is backed by table function 390. For example, all of database view 350, table function 390, guest module 320, and call specification 360 may be individually defined in a database schema and/or database dictionary.

Unlike an ordinary database function that returns a scalar value, table function 390 returns an object that contains tabular data, organized as a set of rows and columns, that DBMS 300 may use as if the returned object were a database table or a row set, such as would be returned by a subquery. In an embodiment, table function 390 is a built in function within DBMS 300 that transforms and aggregates metadata 341-342 into a tabular form. In an embodiment, metadata 341 is originally formatted as a data structure that is well formed, self contained, and/or hierarchical, shown as document 370, that is encoded in a JAVASCRIPT object notation (JSON), even though guest programing language 310 need not be JAVASCRIPT. In an embodiment, metadata 341 (i.e. document 370) is encoded as extensible markup language (XML).

Metadata 341 may be generated on demand by invoking introspection function 330 that is a guest object contained in guest module 320. As explained earlier herein, guest module 320 was created by execution of a DDL statement. In an embodiment, that DDL statement contains a name and/or signature of introspection function 330 as a factory for DBMS 300 to eventually invoke to extract dependency metadata 341. In an embodiment, the name and signature of introspection function 330 is implied (i.e. reserved) by a naming convention for dependency metadata factory functions that can be invoked by DBMS 300. For example, all guest modules in all guest programming languages in DBMS 300 may each contain a guest function with a same name and signature that DBMS 300 expects. Those expected guest functions do not interfere with each other, and there is no collision of a signature or name because DBMS 300 provides each guest module with a separate namespace.

The DDL statement that created guest module 320 or a subsequent DDL statement may create call specification 360 that facilitates invoking introspection function 330 from DML. Typically, invocation parameters and a return type of introspection function 330 are reflected in call specification 360. Thus, metadata 341 is accessible to DML that directly invokes call specification 360 that causes invocation of introspection function 330 that returns metadata 341.

In an embodiment, introspection function 330 and/or call specification 360 are automatically generated. For example, DDL statement(s) that create introspection function 330 and/or call specification 360 may be automatically generated. In an embodiment, such automatic generation may be more or less integrated into bunding tooling that prepares guest modules for loading into DBMS 300. For example, guest module 320 may be based on a custom PYTHON script that depends on some third party PYTHON libraries that may be available as native PYTHON modules and/or PYTHON packages that have not been installed into DBMS 300.

DBMS 300 may provide a bundling tool (not shown) that analyzes the custom PYTHON script, the import statements contained in the script, and/or a library loading path to detect which versions of which PYTHON libraries does the script depend on. For example, the bundling tool may operate more or less as a static linker, such as on a computer of a developer or other client, that assembles the script and its libraries into a bundle (not shown) that can be uploaded and deployed into DBMS 300 as a unit. Operation of the bundling tool entails static resolution of dependencies, such as imports, such that particular versions of particular libraries are identified that satisfy the dependencies.

The bundling tool may identify and/or retrieve libraries in local filesystem(s) and/or on the global Internet such as by URL. During operation, the bundling tool naturally accumulates most or all of the information needed to generate or otherwise configure introspection function 330, metadata 341, and call specification 360. In an embodiment, only the custom PYTHON script is hand written, and the bundling tool automatically generates the bundle, introspection function 330, call specification 360, and discussed DDL statement(s) such as in a DDL script (not shown). In that way, the bundle for guest module 320 is ready for more or less turn-key deployment into DBMS 300. The bundling tool for DBMS 300 may also use artifacts generated by best of breed third party bundling tools for particular guest programing languages as discussed later herein.

As explained above, invocations of table function 390 may convert hierarchical data objects, such as JSON document 370, into tabular data. In an embodiment, table function 390 is a built in function of DBMS 300 that converts JSON into relational data, such as the JSON_TABLE function of SQL/JSON Standard-2016. Example invocations of JSON_TABLE are presented later herein.

In an embodiment, call specification 360 is repeatedly invoked, once for each guest module, to obtain multiple metadata such as 341-342. In an embodiment, each of metadata 341-342 is returned from introspection function 330 as an internal JSON document such as 370. In an embodiment, table function 390 such as JSON_TABLE is repeatedly invoked, once for each JSON document, to obtain multiple table rows that declare dependencies of guest modules. Example fields in such rows are presented later herein.

4.0 Example Introspection Process

Figure 4:
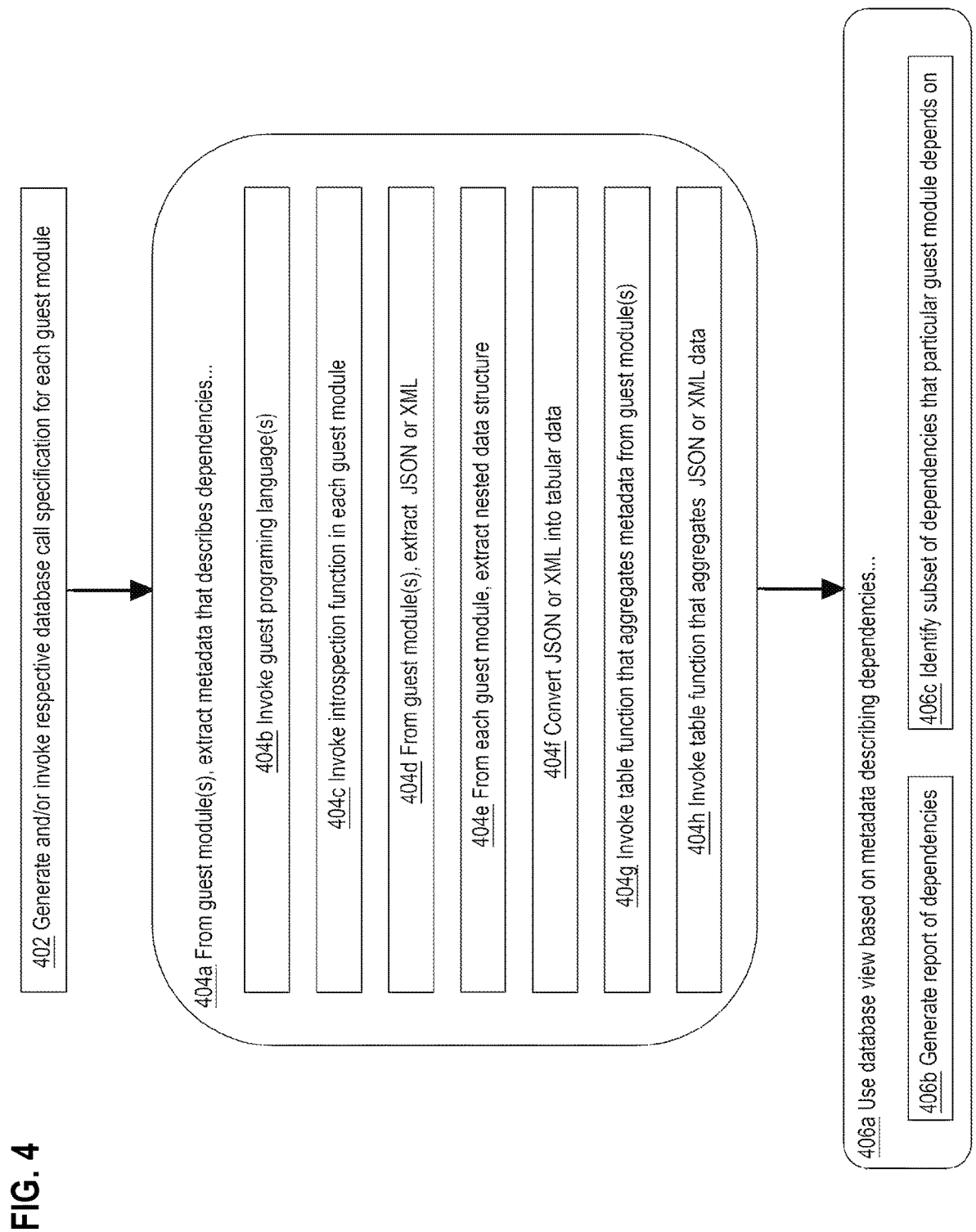
FIG. 4 is a flow diagram that depicts an example DBMS process for extracting, in a language-neutral format from guest modules, dependency metadata that is aggregated by a database table function that backs a database view that may be interrogated to discover module dependencies, such as for identifying dependencies of a particular guest module.

FIG. 4 is a flow diagram that depicts an example process for extracting, in a language-neutral format from guest modules, dependency metadata that is aggregated by a database table function that backs a database view that may be interrogated to discover module dependencies, such as for identifying dependencies of particular guest module(s). FIG. 4 is discussed with reference to FIG. 3

Step 402 is preparatory. As explained later herein, a client program may automatically generate a database call specification for a respective introspection function for each guest module, such as during deployment bundle generation. In an embodiment, DBMS 300 accepts a guest module that lacks some introspection instrumentation, such as an introspection function or its call specification. In that case, step 402 automatically generates those missing parts, which may eagerly occur while defining (i.e. deploying) the guest module in DBMS 300.

In addition to such deployment-time behavior, step 402 invokes the database call specification in each of one, some, or all guest modules in DBMS 300. Invocation of call specification(s) may eagerly occur during deployment, or later on demand. Extraction of dependency metadata from guest module(s) is the reason for the invocation(s), which entails step 404a as follows.

Step 404a extracts metadata that describes dependencies of guest module(s). Step 404a may entail some or all of steps 404b-h that exercise particular metadata extraction techniques. Some embodiments may combine some of steps 404b-h as a same operation. For example, step 404b invokes guest programing language(s) to extract dependency metadata. Likewise, step 404c invokes a respective introspection function in each guest module to extract dependency metadata. Because each introspection function is implemented in a guest programing language, steps 404b-c would be combined. Embodiments may have combinations of same or other steps 404b-h.

Step 404d, f, and g directly process JSON or XML that encodes dependency metadata as follows. Step 404d extracts the JSON or XML from each guest module. For example, each guest module may provide JSON or XML as a global variable or a function return value. Example JSON is presented later herein. Step 404f converts JSON or XML into tabular data. For example, the standard SQL JSON_TABLE function tabularizes JSON data, as exemplified later herein.

Steps 404g-h invoke, such as in DML, a table function that aggregates data. For example, step 404h aggregates different JSON or XML documents that were obtained from different sources. Step 404g aggregates dependency metadata from each guest module.

One dependency may depend on another dependency, in which case dependency metadata may be hierarchical. Step 404e extracts hierarchical metadata as a whole or in pieces to obtain metadata for a transitive closure of interdependent dependencies of a guest module. Whether the hierarchical metadata is extracted as a whole or in pieces depends on the embodiment.

In an exemplary embodiment presented later herein, the metadata hierarchy does not directly reflect a tree of interdependent dependencies, but instead encodes those dependencies as flattened into a same layer, such as a JSON array, within the metadata hierarchy, and the dependency tree can be reconstructed after extracting the flattened layer. For example, metadata for one dependency may cross-reference, by dependency name, metadata elsewhere in the flattened layer for another dependency, as demonstrated later herein. Thus, a dependency hierarchy of arbitrary depth may, if flattened, be extracted without recursion, such as without a recursive DML query and without recursive function invocations. When a first and second dependency both depend on a same third dependency, then the metadata hierarchy is not a tree, but a directed acyclic graph (DAG), which also is well suited for flattening.

Step 406a uses a database view that is based on dependency metadata, which may occur in various scenarios. For example, each of steps 406b-c may be for separate scenarios or a same scenario. Step 406b generates a report of dependencies from the database view. Step 406c uses filtration, such as in DML, to identify particular dependency(s) and/or guest module(s) of interest as discussed earlier herein.

5.0 Module Bundling by Client

Figure 5:
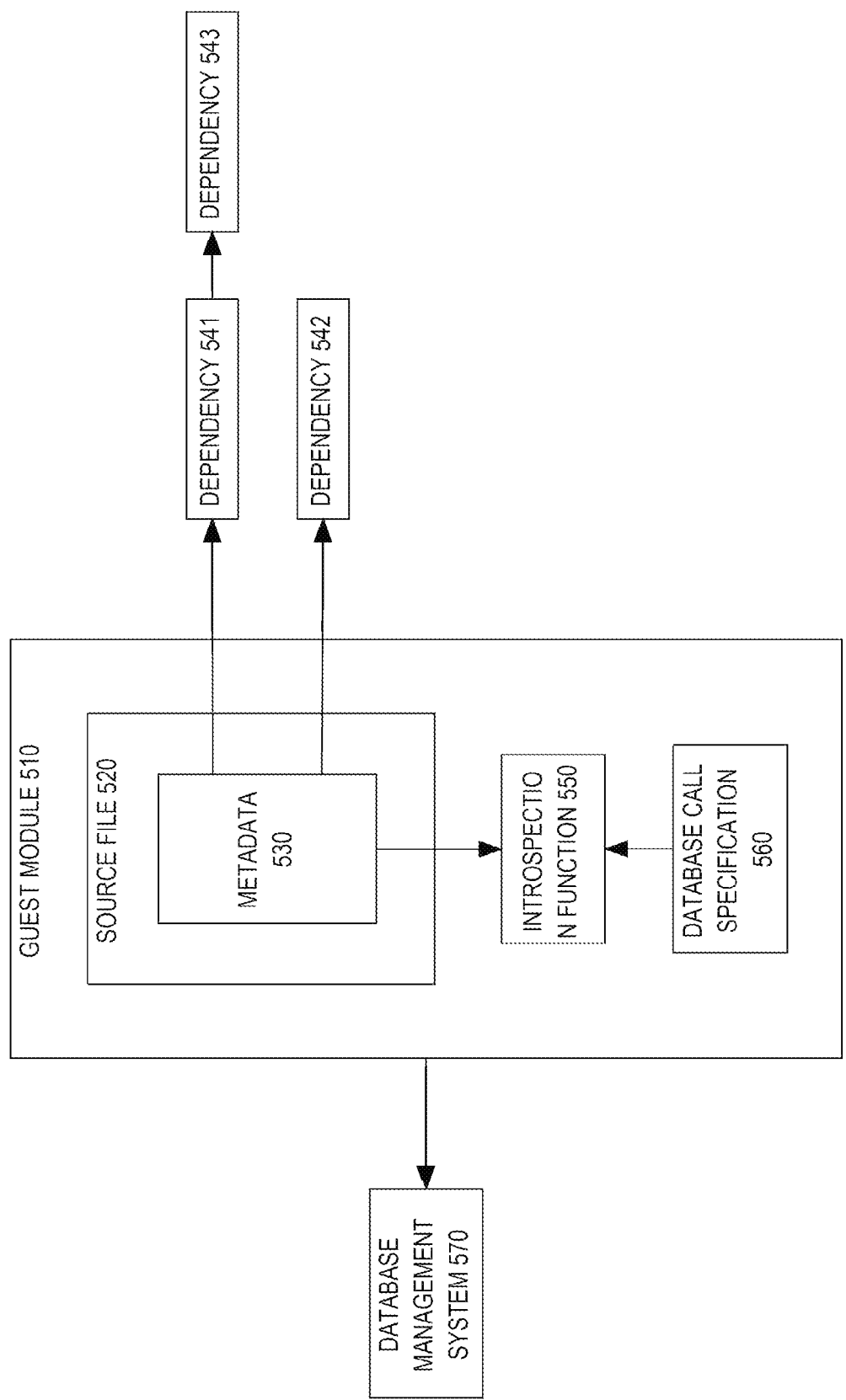
FIG. 5 is a block diagram that depicts an example client program that configures a guest module for dependency discovery by a DBMS.

FIG. 5 is a block diagram that depicts an example client-server system 500, in an embodiment. A client configures a guest module for dependency discovery by DBMS 570. DBMS 570 may be an implementation of DBMS 100.

Client-server system 500 contains a client (not shown) and DBMS 570. In an embodiment, the client is a local client that is hosted by a same computer (not shown) as DBMS 570. In an embodiment, the client is a remote client that uses a communication network (not shown) to interoperate with DBMS 570. In either case, the client may be a software program that contains a database driver that interoperates with DBMS 570 such as with open database connectivity (ODBC).

To ensure that DBMS 570 can readily discover dependencies of guest module 510, the client should configure guest module 510 to include introspection instrumentation as follows. Codebase artifacts of guest module 510 may contain one or more source file(s) such as 520. For example source file 520 may be a script that is written in a guest programing language of DBMS 570, such as PYTHON, JAVASCRIPT, or Ruby.

Source file 520 may include dependencies such as 541-543 by reference. For example, source file 520 may contain a directive to import dependency 541, which may resolve to an instance or a component in an instance of: a script file, a library (i.e. archive) file, or a directory or directory tree in a filesystem.

There may be a hierarchy of dependencies. For example, dependency 541 may be a third party library for digital signatures that depends on dependency 543 that may be a third party library for cryptography. In an embodiment, source file 520 expressly refers only to top level dependencies 541-542, but not their transitive cover (i.e. dependencies of dependencies, such as 543).

In an embodiment, a tool or a person creates a project configuration file that catalogs dependencies 541-543 of guest module 510. For example, tools such as JAVASCRIPT's Webpack or Node Package Manager (NPM) or PYTHON's Pip may generate a dependency metadata file that the client may automatically transform into metadata 530. Such tools and/or the client may aggregate into a single bundle (i.e. archive) file various deliverable artifacts such as source file(s) 520, statically resolved dependencies 541-543, and introspection instrumentation which may include the project configuration file, metadata 530, introspection function 550, and/or database call specification 560.

Introspection function 550 and database call specification 560 may be respective implementations of introspection function 330 and call specification 360 of FIG. 3, which the client may automatically generate before or after generating metadata 530. For example, metadata 530 may be the only part of the introspection instrumentation that is unique to guest module 510. For example, introspection function 550 and/or database call specification 560 may be copied into different guest modules of a same guest programing language as guest module 510.

After automatically configuring guest module 510 into a deliverable bundle, the client may deploy the bundle into DBMS 570, either as an initial deployment or as an upgrade (i.e. replacement) of an earlier version of guest module 510 that was already deployed into DBMS 570. In an embodiment, deployment may entail the client automatically sending the bundle to DBMS 570 such as through a socket for network communication or a socket for inter-process communication (IPC), such as with a transport protocol such as hypertext transfer protocol (HTTP).

In an embodiment, the client sends DBMS 570 a locator such as a filesystem path or an URL, which DBMS 570 may use to automatically retrieve the bundle. For example, the client may send a DDL statement to define guest module 510 in DBMS 570. That DDL statement may contain the locator for the bundle file. In an embodiment, the client or its user stages (e.g. uploads) the bundle file into a filesystem of DBMS 570 before sending the DDL statement that locates the staged bundle file.

Either immediately or later on demand, DBMS 570 may invoke the introspection instrumentation of the bundle file to generate a report of dependencies 541-543 of guest module 510. Some or all dependencies may have been statically linked into the bundle file when the bundle file was generated. In an embodiment, all dependencies should be statically linked.

In an embodiment, other dependencies were cataloged in metadata 530 but were not bundled, in which case DBMS 570 may eagerly or lazily resolve those missing dependencies by dynamic linking, such as when DBMS 570 already has an implementation of a missing dependency. For example, a different guest module of a same guest programing language as guest module 510 may already have an implementation of the missing dependency that can be shared with guest module 510. Likewise, DBMS 570 may use a locator, such as an URL, to retrieve the missing dependency from a codebase repository that is external to DBMS 570. Metadata 530 may contain version information that specifies a minimum, maximum, or range of version numbers that are acceptable to implement the missing dependency.

Metadata 530 may contain a nested data structure to indicate a dependency hierarchy such as when dependency 541 depends on dependency 543. For example, metadata 530 may be encoded as hierarchical JSON or XML. For example, JSON dictionaries may naturally be nested such as an inner dictionary within an outer dictionary, which does not entail flattening.

The outer dictionary may describe dependency 541, and the inner dictionary may describe dependency 543. JSON dictionaries for top level dependencies 541-542 may be elements of a JSON array. For example, metadata 530 may be encoded as that JSON array. Example JSON encodings are presented later herein. Thus, metadata 530 may be a nested structure, and DBMS 570 may or may not use recursion, such as a recursive query or a recursive function, to traverse the nested structure. As explained earlier herein and exemplified later herein, a flattened dependency hierarchy can be extracted without recursion. For example, a flattened dependency hierarchy may nest metadata for each of dependencies 541-543 as a respective element in a JSON array.

6.0 Example Bundling Process

Figure 6:
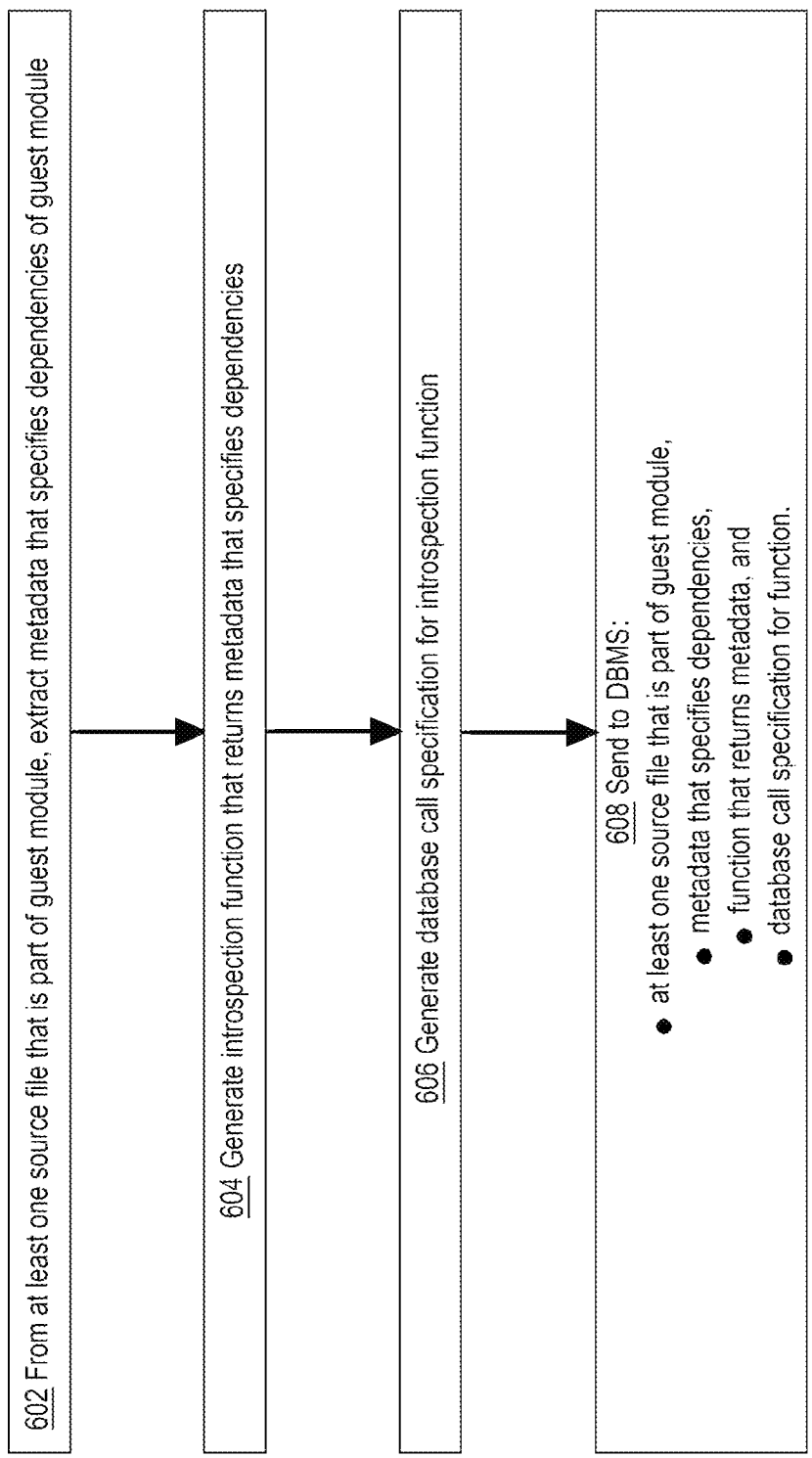
FIG. 6 is a flow diagram that depicts a client process for configuring a guest module for dependency discovery by a DBMS.

FIG. 6 is a flow diagram that depicts an example client process for configuring a guest module for dependency discovery by a DBMS. FIG. 6 is discussed with reference to FIG. 5.

Step 602 extracts, infers, or otherwise derives dependency metadata from source file(s) of a guest module. If the source file is a project configuration file as discussed above, then dependency metadata is more or less directly extracted from the project configuration file.

If the source file is a logic script, then analysis of some or all statements, such as lines of text, in the script may be necessary to detect dependencies. For example, import directives within the script may be analyzed to detect dependencies.

Steps 604 and 606 generate introspection instrumentation that, depending on the embodiment, may or may not depend on the content of the dependency metadata. For example, introspection instrumentation for steps 604 and 606 may be (e.g. exact) copies that can be inserted into any guest module. Step 604 generates an introspection function that returns dependency metadata. Step 606 generates a database call specification for invoking the introspection function from a database statement such as DML.

In an embodiment not shown, a bundling step occurs between steps 604 and 606. For example, the client program may directly, or indirectly through third party tooling, generate a bundle file that contains some or all of the separate artifacts that are subsequently sent in step 606.

Step 606 automatically sends particular deliverable artifacts to the DBMS, such as at least one source file that is part of the guest module, the metadata that specifies the dependencies, the introspection function, and/or the database call specification for the introspection function. For example, those deliverable artifacts may reside in a bundle file that step 606 sends to the DBMS, such as before (i.e. staging in advance) or while defining, such as with DDL, the guest module within the DBMS. In an embodiment, the client program contains, in addition to an ODBC or other database driver, a file uploader.

In an embodiment that pushes files, the DBMS listens on a (e.g. HTTP) socket, and file uploader sends, such as by common gateway interface (CGI) post, the bundle file to the DBMS through that socket. In an embodiment that instead pulls files, the file uploader listens on an HTTP socket, and the DBMS requests that the socket send the bundle file, as identified by a URL that the DBMS may have received from the client in a DDL command to create the guest module.

7.0 Example Dependency Resolution Process

The following is an exemplary embodiment that is based on an ORACLE DBMS and a ORACLE's Multilingual Engine (MLE) as follows. This embodiment uses techniques and components, such as MLE, Truffle, Graal, Substrate, JIT, and Futamura projection, that are defined in context below, and additionally explained in related U.S. patent application Ser. No. 16/556,760. As used below, an MLE language is a guest language; an MLE module is a guest module; and a MLE function is a guest function.

MLE brings a multilingual Framework to the ORACLE Database. The purpose of MLE is to empower a developer to implement stored procedures or user defined functions (UDFs) in languages other than PL/SQL, JAVA, or C. MLE's strong suit is execution of dynamic languages such as JAVASCRIPT, Ruby, PYTHON, or R. MLE is in no way limited to the execution of dynamic languages, and also can run static languages such as JAVA.

The multilingual framework consist of several layers. The top layer is the implementation of a guest language. Each language implementation that runs on MLE is based on ORACLE Truffle, which is a first software implementation layer of MLE. Truffle is a language implementation framework to build high-performance Abstract Syntax Tree (AST) interpreters that run on a virtual machine (VM). Each node in a Truffle AST has an execute method in which it executes its children and returns its own result. The main advantage of a Truffle AST interpreter is that it is self optimizing by using dynamic profiling information.

Such profiles are collected during execution of a guest language program. Significant optimizations include type specializations, rewriting indirect function calls, polymorphic inline caches, branch eliminations, and speculative function in-lining. If these speculative assumptions turn out to be wrong, the specialized tree can be reverted to a more generic version that provides functionality for more generic cases.

When the execution count of a Truffle node reaches a predefined threshold, Truffle triggers partial evaluation by a call to ORACLE Graal. Graal is a dynamic compiler that composes a second MLE layer. Graal is MLE's Just-in-Time compiler (JIT) that performs partial evaluation of parts of the AST. In particular the first Futamura Projection is applied here. Graal's output is highly optimized machine code with deoptimization points.

Those points are implemented as check points where deoptimization should be triggered in case speculative assumption(s) do not hold anymore. Deoptimization means that control is transferred back from the compiled code to the AST interpreter, where specialized nodes are then reverted to a more generic version.

A third layer is the VM. MLE uses the Substrate VM (SVM) which is an embeddable VM that provides services such as code cache or garbage collection.

An MLE language is any programming language supported by MLE. MLE languages are Truffle Languages. The overall goal of MLE is to define the same concepts, requirements, features and client interfaces for all MLE languages in a uniform way.

An MLE module is a unit of MLE language code deployed into an ORACLE relational DBMS (RDBMS). Each MLE module is associated with a single MLE language, and its contents and structure are specific to that MLE language.

Functions defined in an MLE module may be invoked from PL/SQL through call specifications. An MLE function is a function exported by a deployed MLE module that is made available for calling from PL/SQL either as a user-defined function or as a stored-procedure via a PL/SQL call specification.

The following is a DDL example for configuring MLE Language Code for execution according to a PL/SQL call specification for an MLE function.
CREATE OR REPLACE FUNCTION
concat(str1 IN VARCHAR2, str2 IN VARCHAR2) AS MLE MODULE jsmodule
SIGNATURE 'concat(str1 string, str2 string)';

Every MLE function declaration is based on an MLE module. For the above Function, the corresponding MLE module is created by the following example DDL.

```
CREATE OR REPLACE MLE MODULE jsmodule
LANGUAGE JAVASCRIPT AS
module.exports.doNothing = function(str) {
    // do nothing
}
module.exports.concat = function(str1, str2) {
    return str1 + str2;
}
```

The above function can be called as any user defined function as follows.
SELECT CONCAT('HELLO', 'World!') FROM DUAL Programming Language Ecosystems are as follows. Modern Programming Languages like JAVASCRIPT and PYTHON benefit from a rich and vast ecosystem of publicly available libraries and add-on components in the form of packages or language-native modules. As an logical consequence, a database user might deploy MLE modules containing such packages or modules that have been made available through a package manager such as NPM or Pip. However, open source packages or modules often undergo frequent version changes due to active development or security patches and updates.

Code Deployment for Privileged Users is as follows. MLE provides a rich privilege model for creating MLE modules and call specifications:
- CREATE MLE MODULE privilege: a user may deploy MLE modules in the user's own schema
- CREATE ANY MLE MODULE privilege: a user may deploy MLE modules in a schema of another user
- CREATE PROCEDURE privilege: a user may create MLE functions in the user's own schema
- CREATE ANY PROCEDURE privilege: a user may create MLE functions in a schema of another user The privilege model enables users that were granted either the CREATE MLE MODULE or CREATE ANY MLE MODULE privilege to deploy guest language code into the ORACLE RDBMS. This is in sharp contrast to industry practices where only database administrators (DBAs) can deploy code. However, this poses a new challenge: A database administrator may have limited or no knowledge about the deployed code. Therefore an important requirement of the MLE architecture is the ability to introspect the packages and modules an MLE module consists of, such as with this exemplary embodiment.

One of the responsibilities of an Database Administrator is the security and integrity of the RDBMS, for which one of the biggest security concerns is unauthorized access of data. Since MLE is executed in a foreground process of the ORACLE RDBMS, MLE may be used as a vehicle for an exploit on data managed by the RDBMS. This is a substantial concern because part of the source code that is deployed as an MLE module might have originated from public repositories, which are more or less uncontrolled.

As discussed above, MLE provides a rich privilege model that enables users that are not database administrators to deploy code so long as they possess the necessary privileges. However this technical advancement comes at a cost: A lack of transparency for the database administrator in regards to the deployed packages by other users.

For the above reasons, module and package dependency introspection may be an important architectural concern for MLE. This exemplary embodiment includes a solution: two catalog views, which may be database views. The first catalog view is MLE_MODULE_INTROSPECTION_VIEW, which lists the following attributes:

MLE module schema
MLE module name
Module/Package name
Module/Package version
Integrity information as a secure hash algorithm (SHA) hash
Source URL
devDependency: boolean value, indicating if this module/package is a devDependency MLE_MODULE_INTROSPECTION_VIEW lists all module/package dependencies for an MLE module but does not give any information about the module/package dependency hierarchy. For example, MLE module A includes on NPM module B. Likewise, NPM module B requires NPM module C. Module A may be automatically augmented with the following introspection instrumentation that includes hierarchical dependency metadata. For example, the following instrumentation logic may be: automatically appended to a hand written JavaScript script (not shown) that implements the original logic of module A, or executed as a separate script in the same guest language interpretation/execution context.

```
var mlePackageIntrosptExptCnt =
    { "name": "module_a",
    "version": "1.0.0",
    "dependencies": [{
            "name": "babel-core",
            "version": "6.26.3",
            "resolved":    "https://registry.npmjs.org/babel-core/-/babel-core-
            6.26.3.    "integrity":    "sha512-
            6jyFLuDmeidKmUEb3NM+/yawG0M2bDZ9Z1qbZP59cyHLz8kYGK
            "devDependencies": false,
            "dependencies": ["babel-code-frame", "babylon"]
        },
        {
            "name": "babel-code-frame",
            "version": "6.26.0",
            "resolved": "https://registry.npmjs.org/babel-code-frame/-/babel-
            code-f "integrity": "sha1-Y/1D99weO7fONZR9uP42mj9Yx0s=",
            "devDependencies": true
        },
        {
            "name": "babylon",
            "version": "6.18.0",
            "resolved": "https://registry.npmjs.org/babylon/-/babylon-
            6.18.0.tgz", "integrity": "sha512-
            q/UEjfGJ2Cm3oKV71DJz9d25TPnq5rhBVL2Q4fA5 "devDependencies": true
        },
        {
            "name": "async",
            "version": "3.1.0",
            "resolved": "https://registry.npmjs.org/async/-/async-3.1.0.tgz",
            "integrity": "sha512-
            4vx/aaY6j/j3Lw3fbCHNWP0pPaTCew3F6F3hYyl/tHs/ndmV1q
            "devDependencies": false,
            "dependencies": ["babel-core", "babelify"]
        },
        {
            "name": "babelify",
            "version": "10.0.0",
            "resolved": "https://registry.npmjs.org/babelify/-/babelify-
            10.0.0.tgz" "integrity": "sha512-
            X40FaxyH7t3X+JFAKvb1H9wooWKLRCi8pg3m8poq "devDependencies": true
        },
        {
            "name": "lodash",
            "version": "4.17.14",
            "resolved": "https://registry.npmjs.org/lodash/-/lodash-
            4.17.14.tgz", "integrity": "sha512-
            mmKYbW3GLuJeX+iGP+Y7Gp1AiGHGbXHCOh/jZmrawMmsE7MS4z
            "devDependencies": false
        }
    ]
};
function mlePackageIntrosptExptFunc( ) {
    return JSON.stringify(mlePackageIntrosptExptCnt)
}
module.exports.mlePackageIntrosptExptFunc =
mlePackageIntrosptExptFunc;
```

From MLE_MODULE_INTROSPECTION_VIEW, it may be determined that MLE module A contains both NPM module B and NPM module C. Module B may be automatically augmented with the following introspection instrumentation that includes hierarchical dependency metadata. For example, the following instrumentation logic may be: automatically appended to a hand written JavaScript script (not shown) that implements the original logic of module B, or executed as a separate script in the same guest language interpretation/execution. An execution is sticky in the sense that global objects such as variables such as mlePackageIntrosptExptCnt continue to be available to: other script statements that occur later in a same script, and other scripts that are subsequently invoked for the same execution, having more or less the same effect as concatenating (i.e. appending) the multiple scripts in sequence into one monolithic script. For example, bundling and/or instrumenting may rely more or less extensively on concatenation of whole scripts and/or script statements (i.e. lines of text). The following is the dependency instrumentation of JavaScript module B.

```
var
    mlePackageIntrosptExptCnt
    = { "name": "module_b",
    "version": "1.0.0",
    "dependencies": [{
            "name": "mustache",
            "version": "3.0.1",
            "resolved":      "https://registry.npmjs.org/mustache/-/mustache-
            3.0.1.tgz",      "integrity":        "sha512-
            jFI/4UVRsRYdUbuDTKT7KzfOp7FiD5WzYmmwNwXyUVypC0xjoT
            "devDependencies": false,
            "dependencies": ["chai"]
        },
        {
            "name": "chai",
            "version": "4.2.0",
            "resolved": "https://registry.npmjs.org/chai/-/chai-4.2.0.tgz",
            "integrity": "sha512-
            XQU3bhBukrOsQCuwZndwGcCVQHyZi53fQ6Ys1Fym7E4olpIqqZ
            "devDependencies": true
        },
        {
            "name": "validator",
            "version": "11.1.0",
            "resolved": "https://registry.npmjs.org/validator/-/validator-
            11.1.0.tgz" "integrity": "sha512-
            qiQ5ktdO7CD6C/5/mYV4jku/7qnqzjrxb3C/Q5wR3vGGinHTgJ
            "devDependencies": false,
            "dependencies": ["mocha", "nyc"]
        },
        {
            "name": "mocha",
            "version": "6.1.4",
            "resolved": "https://registry.npmjs.org/mocha/-/mocha-6.1.4.tgz",
            "integrity": "sha512-
            PN8CIy4RXsIoxoFJzS4QNnCH4psUCPWc4/rPrst/ecSJJbLBk
            "devDependencies": true
        },
        {
            "name": "nyc",
            "version": "14.1.1",
            "resolved": "https://registry.npmjs.org/nyc/-/nyc-14.1.1.tgz",
            "integrity": "sha512-
            OI0vm6ZGUnoGZv/tLdZ2esSVzDwUC88SNs+6JoSOMVxA+gKMB
            "devDependencies": true
        }
    ]
};
function mlePackageIntrosptExptFunc( ) {
    return JSON.stringify(mlePackageIntrosptExptCnt)
}
module.exports.mlePackageIntrosptExptFunc = mlePackageIntrosptExptFunc;
```

The dependence of NPM module B on NPM module C may not be readily inferred from MLE_MODULE_INTROSPECTION_VIEW. This kind of transitive interdependency information can be gained from the second catalog view MLE_MODULE_CONTENT_HIERARCHY_VIEW, which has the following attributes:
MLE module schema
MLE module name
Module/Package name
Module/Package version
Module/Package Dependencies: module/packages this module/package depends on The information displayed in the catalog views can be used to inform a decision, such as whether or not a deployed MLE module should be updated and redeployed. For example, the module/package bundle information can be cross referenced with a list of available software patches or version upgrades.

Generation of Introspection Information is as follows. MLE is provided with auxiliary helper deployment tools.

For J JAVASCRIPT avaScript the tool is called dbjs and for PYTHON it is called dbpy. The deployment tools are responsible for:
  Source Code Bundling
  Deployment of the MLE Module
  Generation of Call Specifications Bundling infrastructure is leveraged to generate the introspection information while bundling the guest code. The JAVASCRIPT tool dbjs for example is based on WebPack. Specifically, different plug-ins are provided that are integrated with the WebPack infrastructure. In order to generate the introspection information another plug-in is needed. However the bundling information can additionally or instead be generated from the specific project configuration files that the different package managers are using to download and stage various open source packages, modules or libraries. The underlying file for NPM for example is called package.json or package-lock.json. Apache Yet Another Resource Negotiator (Yarn) uses a file named yarn.lock. In the case of Pip it is called pipfile.

Embedding and Exporting Introspection Information in an MLE Module is as follows. Introspection information is exported as a nested datatype such as JSON or XML. This exemplary embodiment uses JSON.

The following two examples show how to embed the introspection information in an MLE module. Here it is shown for two MLE modules. For most of the MLE languages, the export of a JSON value is best done by implementing a function that returns the nested datatype.

The same name should be used for the exporting function across all MLE modules and MLE languages. In these examples below, dependency metadata embedding is facilitated by a function called mlePackageIntrosptExptFunc. As shown both guest modules A and B (source code shown later below) export the same function. In both examples, the package information is stored in the field mlePackageIntrosptExptCnt.

Auxiliary helper deployment tools are configurable to not only include in the MLE module source code but also to create a call specification for the exported function mlePackageIntrosptExptFunc. Specifically, an additional scalar function called MLEPACKAGEINTROSPTEXPTFUNC is embedded in the PL/SQL package definitions for all the exported call specifications of the deployed MLE module. The following code excerpt is a PL/SQL package definition for Module A.

```
CREATE PACKAGE MODULE_A_PACKAGE AS
...
FUNCTION MlePackageIntrosptExptFunc
RETURN VARCHAR2
AS MLE MODULE MODULE_A
SIGNATURE 'mlePackageIntrosptExptFunc( )'
...
END MODULE_A_PACKAGE;
```

Catalog View Definitions are as follows. To expose the introspection information in form of a catalog view, a scalar function should be used that takes the schema and name of the MLE module as arguments. With that information, the scalar function invokes the MLE function MlePackageIntrosptExptFunc of the pre-defined PL/SQL package (shown above) to export the introspection information in form of JSON. The scalar function MlePackageIntrosptExptFuncInvoc is invoked, such as with the following logic.

```
CREATE OR replace FUNCTION
MLEPACKAGEINTROSPTEXPTFUNCINVOC
(schema VARCHAR, name VARCHAR) RETURN VARCHAR2
AS
cmd VARCHAR(256); result VARCHAR(4000);
BEGIN
cmd := 'SELECT '
 || Ltrim(Rtrim(schema))
 || '.'
 || Ltrim(Rtrim(name))
 || '.MLEPACKAGEINTROSPTEXPTFUNC( ) from dual';
EXECUTE IMMEDIATE cmd INTO result;
RETURN result;
END;
```

MLE_MODULE_INTROSPECTION_VIEW has a view definition with the following PL/SQL Code. The view makes use of a common table expression denoted by js (WITH clause). Within js, MlePackageIntrosptExptFuncInvoc is invoked for every deployed MLE module. The following code invokes JSON_TABLE as discussed earlier herein.

Details of SQL/JSON path expression syntax for JSON_TABLE is presented later herein in section SQL/JSON PATH EXPRESSION SYNTAX FOR JSON_TABLE. Notably: an absolute path expression begins with a dollar sign ($); a relative path expression is an at sign (@); and [*] selects all elements of an array. The following is a definition of MLE_MODULE_INTROSPECTION_VIEW.

```
CREATE VIEW MLE_MODULE_INTROSPECTION_VIEW AS
WITH js AS
(
    SELECT DISTINCT owner,
    object_name AS mle_module_name,
    Mlepackageintrosptexptfuncinvoc(owner, object_name)
    AS info FROM all_objects
    WHERE object_type = 'MLE MODULE')
SELECT owner,
            mle_module_name,
            module_name,
            id,
            dependen
            cy_name,
            version,
            resolved
            ,
            integrit
            y,
            devdepen
            dencies
FROM
    js, json_table(info, '$[*]' COLUMNS(
    module_name VARCHAR2(20) path
    '$.name',
        NESTED PATH '$.dependencies[*]' COLUMNS (
            id FOR ordinality, dependency_name VARCHAR(256)
            path
            '$.name[*]', version VARCHAR(256) path '$.version[*]',
            resolved VARCHAR(256) path '$.resolved[*]',
            integrity VARCHAR(256) path
            '$.integrity[*]',
            devdependencies INTEGER path '$.devDependencies[*]')))
```

The list of deployed MLE modules is gathered from the catalog view all objects. The result of js is a list of:
  the schema a MLE module is deployed in (owner),
  the name of the MLE module (mle_module_name) and
  the introspection information in form of JSON (info).

As can be seen from the FROM clause, the JSON_TABLE query extension for SQL is heavily used. The deployed module name is obtained by reading the name attribute of the JSON through the top-level COLUMNS clause. Since the different dependencies of a guest module are an array of JSON objects as global variable mlePackageIntrosptExptCnt as shown earlier herein, the NESTED PATH feature is used.

FIG. 7 shows the result of a straightforward select query of MLE_MODULE_INTROSPECTION_VIEW for example deployments of Module A and Module B. The MLE_MODULE_INTROSPECTION_VIEW lists all bundled modules and packages that went into the creation of an MLE module. For a module/package dependency hierarchy however a second view needs to be queried, which is MLE_MODULE_CONTENT_HIERARCHY_VIEW that is defined by the following logic.

```
CREATE VIEW MLE_MODULE_CONTENT_HIERARCHY_VIEW
AS WITH js AS
(
    SELECT DISTINCT owner,
    object_name AS mle_module_name,
    Mlepackageintrosptexptfuncinvoc(owner, object_name)
    AS info FROM all_objects
    WHERE object_type = 'MLE MODULE' )
SELECT owner,
            mle_module_
            name,
            module_nam
            e,
            id,
            dependency_
            name,
            version,
            s
            u
            b
            _
            i
            d
            ,
            s
            u
            b
            _
            d
            e
            p
FROM
js, json_table(info, '$[*]' COLUMNS(
module_name VARCHAR2(20) path '$.name',
        NESTED PATH '$.dependencies[*]' COLUMNS (
            id FOR ordinality, dependency_name VARCHAR(256)
            path
            '$.name[*]', version VARCHAR(256) path '$.version[*]',
                NESTED PATH '$.dependencies[*]' COLUMNS
                ( sub_id for ordinality,
                    sub_dep varchar(256) path '$[*]')
            )))
```

The above view definition has many similarities to MLE_MODULE_INTROSPECTION_VIEW with an import exception. For MLE_MODULE_CONTENT_HIERARCHY_VIEW, a second level NESTED PATH expression normalizes the content of the nested dependencies JSON ARRAY. FIG. 8 shows the result of a straightforward select query of MLE_MODULE_CONTENT_HIERARCHY_VIEW for example deployments of Module A and Module B.

8.0 SQL/JSON Path Expression Syntax for JSON_TABLE

SQL/JSON Path Expression Syntax, such as for use with JSON_TABLE, is as follows. SQL/JSON path expressions are matched by SQL/JSON functions and conditions against JSON data, to select portions of it. Path expressions can use wildcards and array ranges. Matching is case-sensitive. Use entails passing a SQL/JSON path expression and some JSON data to a SQL/JSON function, such as JSON_TABLE, or a SQL/JSON condition. The path expression is matched against the data, and the matching data is processed by the particular SQL/JSON function or condition. The matching process operates such that the path expression returns the matched data to the function or condition.

Basic SQL/JSON Path Expression Syntax is as follows. The basic syntax of a SQL/JSON path expression is presented. It is composed of a context-item symbol ($) followed by zero or more object, array, and descendant steps, each of which can be followed by a filter expression, followed optionally by a function step. Examples are provided below herein.

SQL/JSON Path Expression Syntax Relaxation is as follows. The basic SQL/JSON path-expression syntax is relaxed to allow implicit array wrapping and unwrapping. This means that the is no need to change a path expression in original guest module code if data evolves to replace a JSON value with an array of such values, or vice versa. Examples are provided later herein.

The basic syntax of a SQL/JSON path expression is as follows. It is composed of a context-item symbol ($) followed by zero or more object, array, and descendant steps, each of which can be followed by a filter expression, followed optionally by a function step. Examples are provided.

However, this basic syntax is extended by relaxing the matching of arrays and non-arrays against non-array and array patterns, respectively. Matching of data against SQL/JSON path expressions is case-sensitive. A SQL/JSON basic path expression (also called just a path expression here) is an absolute path expression or a relative path expression.

An absolute path expression begins with a dollar sign ($), which represents the path-expression context item, that is, the JSON data to be matched. That data is the result of evaluating a SQL expression that is passed as argument to the SQL/JSON function. The dollar sign is followed by zero or more nonfunction steps, followed by an optional function step.

A relative path expression is an at sign (@) followed by zero or more nonfunction steps, followed by an optional function step. It has the same syntax as an absolute path expression, except that it uses an at sign instead of a dollar sign ($).

A relative path expression is used inside a filter expression (filter, for short). The at sign represents the path-expression current filter item, that is, the JSON data that matches the part of the (surrounding) path expression that precedes the filter containing the relative path expression. A relative path expression is matched against the current filter item in the same way that an absolute path expression is matched against the context item.

A nonfunction step is an object step, an array step, or a descendant step, followed by an optional filter expression. A single function step is optional in a basic path expression (absolute or a relative). If present, it is the last step of the path expression. It is a period (.), sometimes read as "dot", followed by a SQL/JSON item method, followed by a left parenthesis (( ) and then a right parenthesis ( )). The parentheses can have whitespace between them (such whitespace is insignificant).

The item method is applied to the data that is targeted by the rest of the same path expression, which precedes the function step. The item method is used to transform that data. The SQL function or condition that is passed the path expression as argument uses the transformed data in place of the targeted data.

An object step is a period (.), followed by an object field name or an asterisk (*) wildcard, which stands for (the values of) all fields. A field name can be empty, in which case it must be written as " " (no intervening whitespace). A nonempty field name must start with an uppercase or lowercase letter A to Z and contain only such letters or decimal digits (0-9), or else it must be enclosed in double quotation marks ("). An object step returns the value of the field that is specified. If a wildcard is used for the field then the step returns the values of all fields, in no special order.

An array step is a left bracket ([) followed by either an asterisk (*) wildcard, which stands for all array elements, or one or more specific array indexes or range specifications separated by commas (,), followed by a right bracket (]). An error is raised if both an asterisk and either an array index or a range specification is used.

In a path expression, array indexing is zero-based (0, 1, 2, . . . ), as in the JAVASCRIPT convention for arrays. A range specification has the form N to M, where N and M are array indexes and N is strictly less than M.Foot 1 An error is raised at query compilation time if N is not less than M.

When indexes or range specifications are used, the array elements they collectively specify must be specified in ascending order, without repetitions, or else a compile-time error is raised. For example, an error is raised for each of [3, 1 to 4], [4, 2], [2, 3 to 3], and [2, 3, 3]. Errors are raised on the first two because the order is not ascending, Errors are raised on the last two because of the repetition of array index 3 (which indexes the fourth array element, because of zero-based indexing).

Similarly, the elements in the array value that results from matching are in ascending order, with no repetitions. If an asterisk is used in the path expression then all of the array elements are returned, in array order.

A descendant step is two consecutive periods (..), sometimes read as "dot dot", followed by a field name (which has the same syntax as for an object step). It descends recursively into the objects or arrays that match the step immediately preceding it (or into the context item if there is no preceding step).

At each descendant level, for each object and for each array element that is an object, it gathers the values of all fields that have the specified name. It returns all of the gathered field values. For example, consider this query and data:

```
json_query(some_json_column, '$.a..z' WITH ARRAY WRAPPER)
{ "a" : { "b" : { "z" : 1 },
       "c" : [ 5, { "z" : 2 } ],
       "z" : 3 }
  "z" : 4 }
```

The query returns an array, such as [1,2,3], whose elements are 1, 2, and 3. It gathers the value of each field z within the step that immediately precedes the dot dot (..), which is field a. The topmost field z, with value 4, is not matched because it is not within the value of field a.

The value of field a is an object, which is descended into. It has a field z, whose value (3) is gathered. It also has a field b whose value is an object, which is descended into to gather the value of its field z, which is 1. It also has a field c whose value is an array, which has an element that is an object with a field z, whose value (2) is gathered. The JSON values gathered are thus 3, 1, and 2. They are wrapped in an array, in an undefined order. One of the possible return values is [1,2,3].

A filter expression (filter, for short) is a question mark (?) followed by a filter condition enclosed in parentheses (( )). A filter is satisfied if its condition is satisfied, that is, returns true. A filter condition applies a predicate (Boolean function) to its arguments and is one of the following, where each of cond, cond1, and cond2 stands for a filter condition.

(cond): Parentheses are used for grouping, separating filter condition cond as a unit from other filter conditions that may precede or follow it.

cond1 && cond2: The conjunction (and) of cond1 and cond2, requiring that both be satisfied.

cond1∥cond2: The inclusive disjunction (or) of cond1 and cond2, requiring that cond1, cond2, or both, be satisfied.

! (cond): The negation of cond, meaning that cond must not be satisfied.

exists (, followed by a relative path expression, followed by): The condition that the targeted data exists (is present).

A comparison, which is one of the following:
  A relative path expression, followed by a comparison predicate, followed by either a JSON scalar value or a SQL/JSON variable.
  Either a JSON scalar value or a SQL/JSON variable, followed by a comparison predicate, followed by a relative path expression.
  A JSON scalar value, followed by a comparison predicate, followed by another JSON scalar value.
  A relative path expression, followed by has substring, starts with, like, like_regex, or eq_regex, followed by either a JSON string or a SQL/JSON variable that is bound to a SQL string (which is automatically converted from the database character set to UTF8).
    has substring means that the matching data value has the specified string as a substring.
    starts with means that the matching data value has the specified string as a prefix.
    like means that the JSON string data value matches the specified string, which is interpreted as a SQL LIKE pattern that uses SQL LIKE4 character-set semantics. A percent sign (%) in the pattern matches zero or more characters. An underscore (_) matches a single character.
    Note: Unlike the case for SQL LIKE, there is no escape character for path-expression predicate like. It is recommended to avoid using character ', GRAVE ACCENT (U+0060), in like patterns—that character, also known sometimes as backquote or backtick, is reserved for future use.
    like_regex means that the JSON string data value matches the specified string, which is interpreted as a SQL REGEXP LIKE regular expression pattern that uses SQL LIKE4 character-set semantics.
    like_regex is exceptional among the pattern-matching comparisons, in that its pattern matches the empty JSON string (" ").
    eq_regex is just like like_regex, except for these two differences:
      eq_regex matches its regular expression pattern against the entire JSON string data value—the full string must match the pattern for the comparison to be satisfied. like_regex is satisfied if any portion of the JSON string matches the pattern.
      The eq_regex pattern does not match the empty JSON string (" ").

For all of these predicates, a pattern that is the empty string (" ") matches data that is the empty string. And for all except like_regex, a pattern that is a nonempty string does not match data that is the empty string. For like_regex a nonempty pattern does match empty-string data.

A relative path expression, followed by in, followed by a value list, meaning that the value is one of those in the value list.

A comparison predicate is ==, <>, !=Foot 2, <, <=, >=, or >, meaning equals, does not equal, is less than, is less than or equal to, is greater than or equal to, and is greater than, respectively.

A SQL/JSON variable is a dollar sign ($) followed by the name of a SQL identifier that is bound in a PASSING clause for json_exists.

A value list is (, followed by a list of one or more scalar values and SQL/JSON variables separated by commas (,), followed by).

The predicates that can be used in filter conditions are thus &&, ||, !, exists, ==, <>, !=, <, <=, >=, >, and in.

As an example, the filter condition (a||b) && (!(c)||d<42) is satisfied if both of the following criteria are met:

At least one of the filter conditions a and b is satisfied: (a||b).

Filter condition c is not satisfied or the number d is less than or equal to 42, or both are true: (!(c)||d<42).

Comparison predicate ! has precedence over &&, which has precedence over ||. It is always possible to use parentheses to control grouping.

Without parentheses for grouping, the preceding example would be a||b && !(c)||d<42, which would be satisfied if at least one of the following criteria is met:

Condition b && !(c) is satisfied, which means that each of the conditions b and !(c) is satisfied (which in turn means that condition c is not satisfied).

Condition a is satisfied.

Condition d<42 is satisfied.

At least one side of a comparison must not be a SQL/JSON variable. The default type for a comparison is defined at compile time, based on the type(s) for the non-variable side(s). It is possible to use a type-specifying item method to override this default with a different type. The type of matching data is automatically converted, for the comparison, to fit the determined type (default or specified by item method). For example, $.a>5 imposes numerical comparison because 5 is a number, $.a>"5" imposes string comparison because "5" is a string.

Note: For powerful full-text search, use ORACLE SQL function json_textcontains, which may require creating a JSON search index. As a less-powerful alternative, if a JSON search index is not created, and a simple string pattern-matching in a filter condition is desired, it is possible to use any of the pattern-matching comparisons: has substring, starts with, like, like_regex, or eq_regex.

Here are some examples of path expressions, with their meanings spelled out in detail.

$—The context item.

$.friends—The value of field friends of a context-item object. The dot (.) immediately after the dollar sign ($) indicates that the context item is a JSON object.

$.friends[0]—An object that is the first element of an array that is the value of field friends of a context-item object. The bracket notation indicates that the value of field friends is an array.

$.friends[0].name—Value of field name of an object that is the first element of an array that is the value of field friends of a context-item object. The second dot (.) indicates that the first element of array friends is an object (with a name field).

$.friends[*].name—Value of field name of each object in an array that is the value of field friends of a context-item object.

$.*[*].name—Field name values for each object in an array value of a field of a context-item object.

$.friends[3, 8 to 10, 12]—The fourth, ninth through eleventh, and thirteenth elements of an array friends (field of a context-item object). The elements must be specified in ascending order, and they are returned in that order: fourth, ninth, tenth, eleventh, thirteenth.

$.friends[3].cars—The value of field cars of an object that is the fourth element of an array friends. The dot (.) indicates that the fourth element is an object (with a cars field).

$.friends[3].*—The values of all of the fields of an object that is the fourth element of an array friends.

$.friends[3].cars[0].year—The value of field year of an object that is the first element of an array that is the value of field cars of an object that is the fourth element of an array friends.

$.friends[3].cars[0]?(@.year>2016)—The first object of an array cars (field of an object that is the fourth element of an array friends), provided that the value of its field year is, or can be converted to, a number greater than 2016. A year value such as "2017" is converted to the number 2017, which satisfies the test. A year value such as "recent" fails the test—no match.

$.friends[3].cars[0]?(@.year.number( )>2016)—Same as the previous. Item method number( ) allows only a number or a string value that can be converted to a number, and that behavior is already provided by numeric comparison predicate>.

$.friends[3].cars[0]?(@.year.numberOnly( )>2016)—Same as the previous, but only if the year value is a number. Item method numberOnly( ) excludes a car with a year value that is a string numeral, such as "2017".

$.friends[3]?(@.addresses.city "San Francisco")—An object that is the fourth element of an array friends, provided that it has an addresses field whose value is an object with a field city whose value is the string "San Francisco".

$.friends[*].addresses?(@city starts with "San").zip—Zip codes of all addresses of friends, where the name of the address city starts with "San". (In this case the filter is not the last path step.)

$..zip—All values of a zip field, anywhere, at any level.

$.friends[3]?(@.addresses.city=="San Francisco" && @.addresses.state=="Nevada")—Objects that are the fourth element of an array friends, provided that there is a match for an address with a city of "San Francisco" and there is a match for an address with a state of "Nevada".

Note: The filter conditions in the conjunction do not necessarily apply to the same object—the filter tests for the existence of an object with city San Francisco and for the existence of an object with state Nevada. It does not test for the existence of an object with both city San Francisco and state Nevada. See Using Filters with JSON_EXISTS.

$friends[3].addresses?(@.city=="San Francisco" && @.state=="Nevada")—An object that is the fourth element of array friends, provided that object has a match for city of "San Francisco" and a match for state of "Nevada".

Unlike the preceding example, in this case the filter conditions in the conjunction, for fields city and state, apply to the same addresses object. The filter applies to a given addresses object, which is outside it.

9.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as ORACLE, such as ORACLE Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

9.1 Query Processing

A query is an expression, command, or set of commands that, when executed, causes a server to perform one or more operations on a set of data. A query may specify source data object(s), such as table(s), column(s), view(s), or snapshot (s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
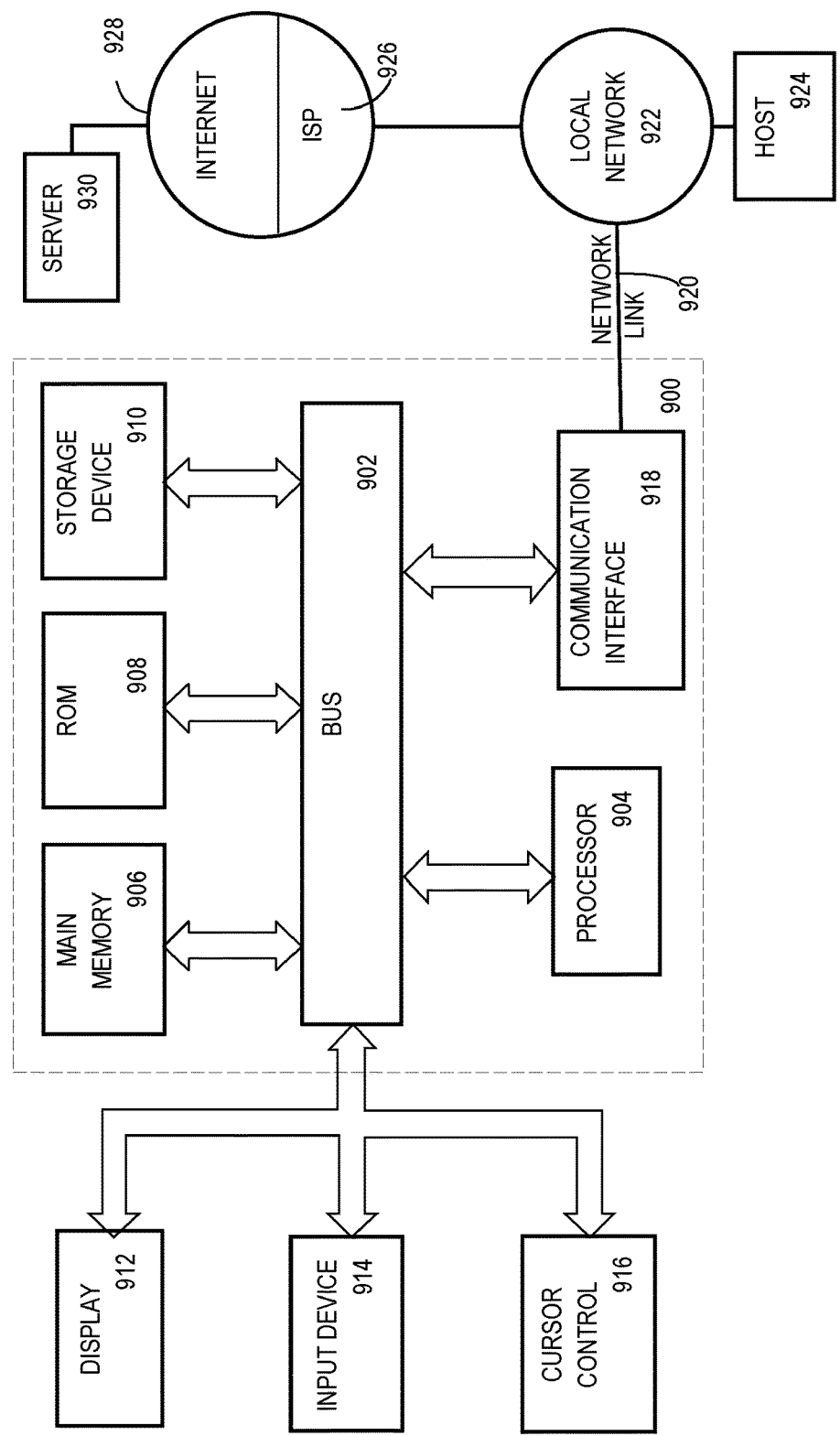
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
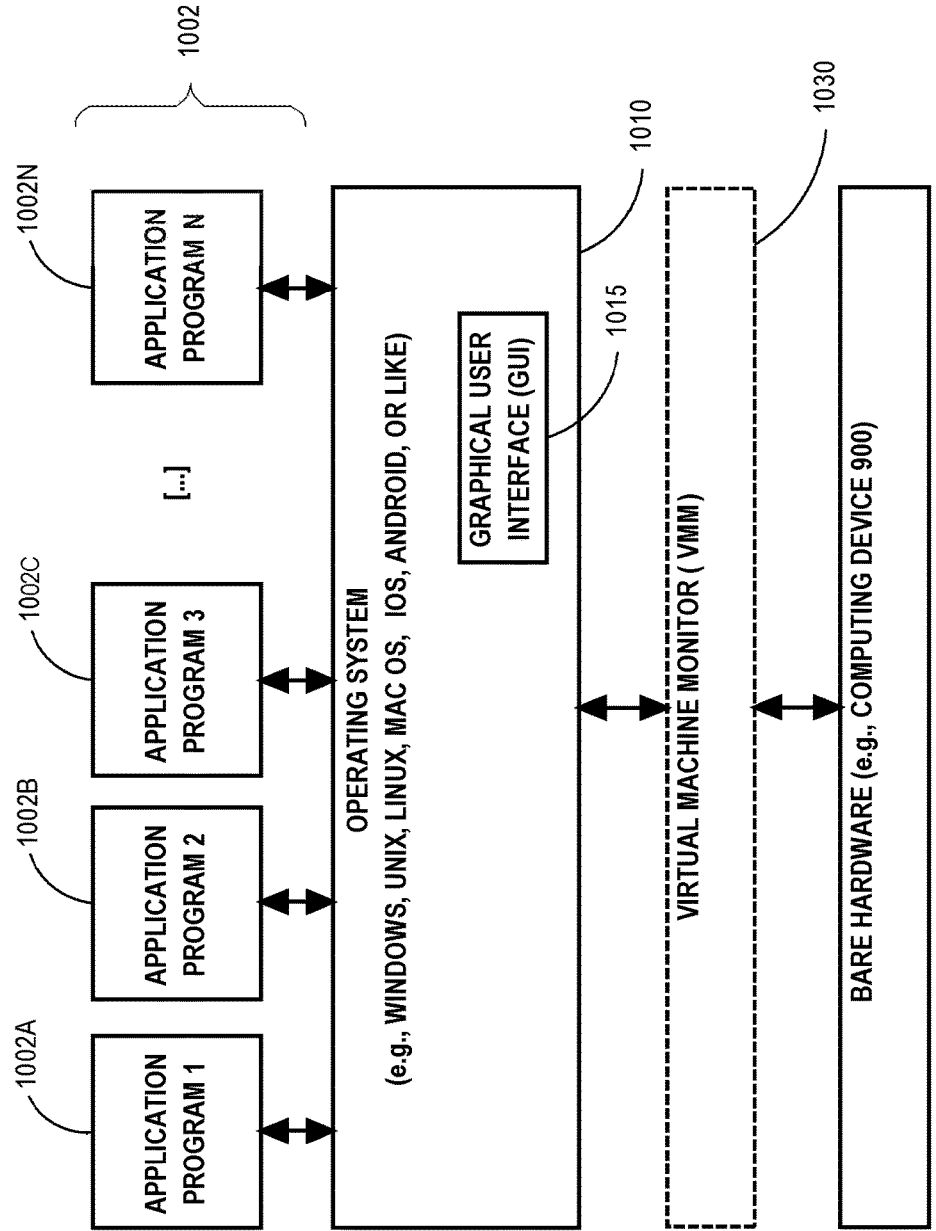
FIG. 10 is a block diagram that illustrates a basic software system that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1000 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   invoking, in each guest module of one or more guest modules that are defined in one or more guest programing languages that are implemented in a database management system (DBMS), logic to obtain metadata that describes a plurality of dependencies that the guest module depends on, wherein said obtain the metadata that describes the plurality of dependencies comprises invoking a table function that aggregates JSON data from separate documents, wherein the table function that aggregates JSON data is defined in a database dictionary;
   generating a report of dependencies that is based on the metadata that describes the plurality of dependencies;
   identifying, based on the report of dependencies, a subset of the plurality of dependencies that a particular guest module of the one or more guest modules depends on.

2. The method of claim 1 wherein the report of dependencies comprises, for each dependency of the plurality of dependencies,
   a timestamp of when an implementation of the dependency was incorporated into the DBMS.

3. The method of claim 1 wherein said report of dependencies comprises, for each dependency of the plurality of dependencies, a flag that indicates whether the dependency is for testing or for development tooling.

4. The method of claim 1 wherein said generating the report of dependencies or said identifying the subset of the plurality of dependencies that the particular guest module depends on comprises using a database view that is based on the metadata that describes the plurality of dependencies.

5. The method of claim 1 wherein said obtain the metadata that describes the plurality of dependencies comprises invoking the one or more guest programing languages.

6. The method of claim 1 wherein said obtain the metadata that describes the plurality of dependencies comprises converting JSON data into tabular data.

7. The method of claim 1 wherein:
   the metadata that describes the plurality of dependencies comprises a nested data structure;
   at least one of the one or more guest modules contains the nested data structure.

8. The method of claim 1 wherein said obtain the metadata that describes the plurality of dependencies comprises invoking a table function that aggregates and returns metadata from the one or more guest modules.

9. One or more non-transitory computer-readable media storing instructions that, when executed by one or more processors, cause:
   invoking, in each guest module of one or more guest modules that are defined in one or more guest programing languages that are implemented in a database management system (DBMS), logic to obtain metadata that describes a plurality of dependencies that the guest module depends on, wherein said obtain the metadata that describes the plurality of dependencies comprises invoking a table function that aggregates JSON data from separate documents, wherein the table function that aggregates JSON data is defined in a database dictionary;
   generating a report of dependencies that is based on the metadata that describes the plurality of dependencies;
   identifying, based on the report of dependencies, a subset of the plurality of dependencies that a particular guest module of the one or more guest modules depends on.

10. The one or more non-transitory computer-readable media of claim 9 wherein the report of dependencies comprises, for each dependency of the plurality of dependencies,
    a timestamp of when an implementation of the dependency was incorporated into the DBMS.

11. The one or more non-transitory computer-readable media of claim 9 wherein said report of dependencies comprises, for each dependency of the plurality of dependencies, a flag that indicates whether the dependency is for testing or for development tooling.

12. The one or more non-transitory computer-readable media of claim 9 wherein said generating the report of dependencies or said identifying the subset of the plurality of dependencies that the particular guest module depends on comprises using a database view that is based on the metadata that describes the plurality of dependencies.

13. The one or more non-transitory computer-readable media of claim 9 wherein said obtain the metadata that describes the plurality of dependencies comprises invoking the one or more guest programing languages.

14. The one or more non-transitory computer-readable media of claim 9 wherein said obtain the metadata that describes the plurality of dependencies comprises converting JSON data into tabular data.

15. The one or more non-transitory computer-readable media of claim 9 wherein:
    the metadata that describes the plurality of dependencies comprises a nested data structure;
    at least one of the one or more guest modules contains the nested data structure.

* * * * *